US009792597B1

(12) United States Patent
Jen et al.

(10) Patent No.: US 9,792,597 B1
(45) Date of Patent: Oct. 17, 2017

(54) PRODUCT CATALOG SERVICES

(71) Applicant: Square, Inc., San Francisco, CA (US)

(72) Inventors: Mark Jen, San Francisco, CA (US); Shawn Morel, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/964,198

(22) Filed: Dec. 9, 2015

Related U.S. Application Data

(60) Provisional application No. 62/248,874, filed on Oct. 30, 2015.

(51) Int. Cl.
*G06Q 20/00* (2012.01)
*G06Q 20/20* (2012.01)
*G06Q 30/06* (2012.01)

(52) U.S. Cl.
CPC ......... *G06Q 20/202* (2013.01); *G06Q 20/203* (2013.01); *G06Q 30/0603* (2013.01); *G06Q 30/0625* (2013.01); *G06Q 30/0635* (2013.01)

(58) Field of Classification Search
CPC .............................. G06Q 30/00; G06Q 30/06
USPC ............................................. 705/21, 16, 26
See application file for complete search history.

(56) References Cited

U.S. PATENT DOCUMENTS

| | | | | |
|---|---|---|---|---|
| 6,397,212 B1 * | 5/2002 | Biffar | ................ | G06F 17/30864 705/7.29 |
| 6,917,922 B1 * | 7/2005 | Bezos | .................. | G06Q 10/087 705/26.81 |
| 7,013,290 B2 * | 3/2006 | Ananian | ........... | G06F 17/30867 705/26.42 |
| 7,133,882 B1 * | 11/2006 | Pringle | .................. | G06Q 30/06 |
| 8,065,189 B1 * | 11/2011 | Ballaro | ................ | G06Q 10/087 705/26.1 |
| 8,065,202 B1 * | 11/2011 | Ballaro | ................ | G06Q 10/087 705/27.2 |
| 8,069,096 B1 * | 11/2011 | Ballaro | ................ | G06Q 10/087 705/27.2 |
| 8,112,317 B1 * | 2/2012 | Ballaro | ................ | G06Q 10/087 705/26.1 |
| 2002/0077914 A1 * | 6/2002 | Shatzkin | .............. | G06Q 10/087 705/22 |
| 2005/0222815 A1 * | 10/2005 | Tolly | .................... | H04L 12/2697 702/185 |
| 2006/0085294 A1 * | 4/2006 | Boerner | ............... | G06Q 10/087 705/28 |
| 2007/0156538 A1 * | 7/2007 | Peter | ...................... | G06Q 10/10 705/26.81 |

(Continued)

*Primary Examiner* — Seye Iwarere
(74) *Attorney, Agent, or Firm* — Lee & Hayes, PLLC

(57) ABSTRACT

A product catalog service allows business entities to create and store product catalogs indicating products that are available from the business entities. A product catalog includes multiple product family definitions. Each product family definition specifies attribute names of a product family and, for each attribute name, a set of allowed attribute values. In order to specify a particular product variant, an entity may supply one of the allowed attribute values for each specified attribute name of the product. The product catalogs may be received from multiple business entities. Each product catalog may also be shared with multiple business entities. A merchant, for example, may select products from a product catalog to purchase from another merchant. When creating a product catalog, a business entity may reference product family definitions of other product catalogs.

14 Claims, 11 Drawing Sheets

(56) References Cited

U.S. PATENT DOCUMENTS

| | | | | |
|---|---|---|---|---|
| 2008/0243641 | A1* | 10/2008 | Leno | G06Q 20/20 |
| | | | | 705/16 |
| 2009/0171811 | A1* | 7/2009 | Peter | G06Q 10/10 |
| | | | | 705/26.1 |
| 2009/0265251 | A1* | 10/2009 | Dunlap | G06Q 10/087 |
| | | | | 705/26.1 |
| 2010/0023391 | A1* | 1/2010 | Hudetz | G06Q 30/02 |
| | | | | 705/14.41 |
| 2010/0057554 | A1* | 3/2010 | Lanford | G06Q 20/20 |
| | | | | 705/14.38 |
| 2010/0070376 | A1* | 3/2010 | Proud | G06Q 20/20 |
| | | | | 705/21 |
| 2011/0258083 | A1* | 10/2011 | Ren | G06Q 10/087 |
| | | | | 705/27.1 |
| 2014/0244416 | A1* | 8/2014 | Venkat | G06Q 30/0603 |
| | | | | 705/26.1 |
| 2015/0154682 | A1* | 6/2015 | Ram | G06Q 30/0625 |
| | | | | 705/26.62 |
| 2015/0356484 | A1* | 12/2015 | Velusamy | G06Q 10/06315 |
| | | | | 705/7.25 |
| 2016/0171540 | A1* | 6/2016 | Mangipudi | G06Q 30/0255 |
| | | | | 705/14.53 |

* cited by examiner

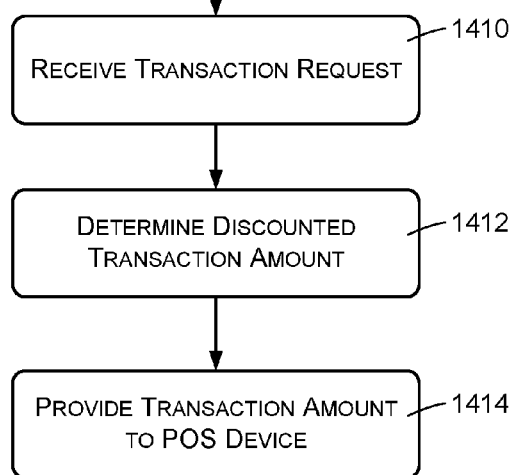
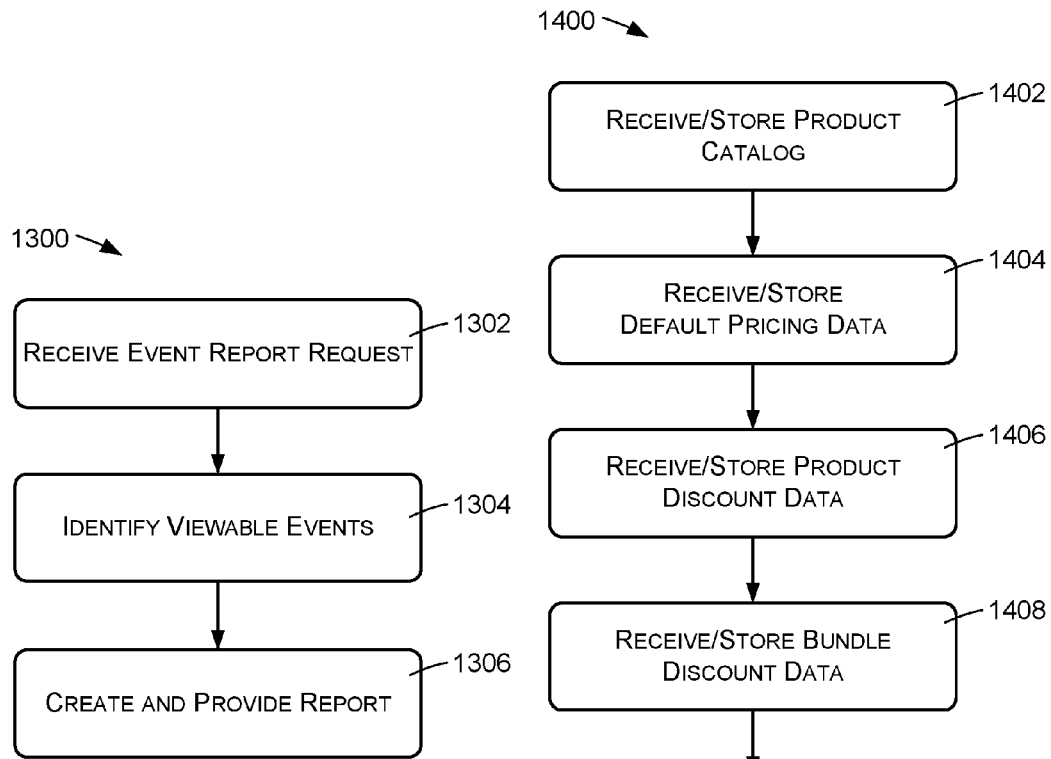
FIG. 13
FIG. 14

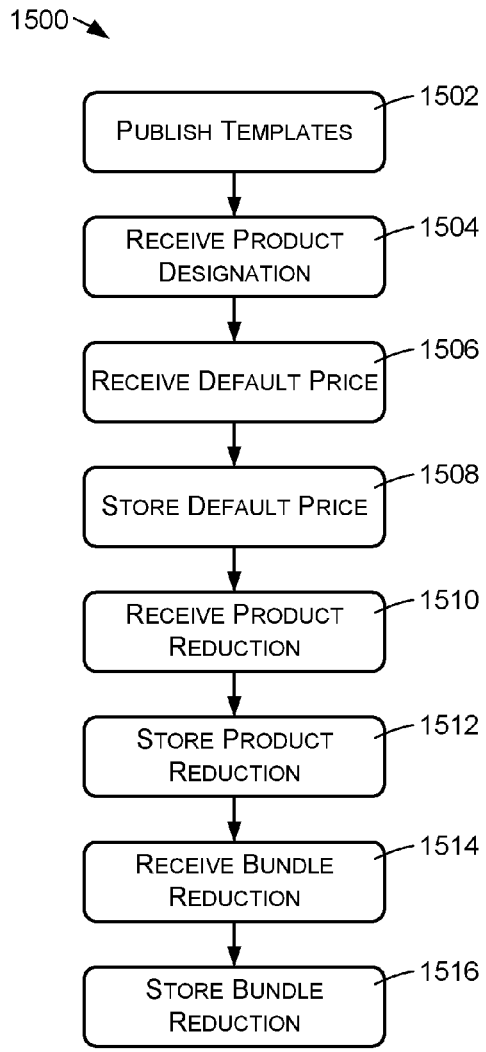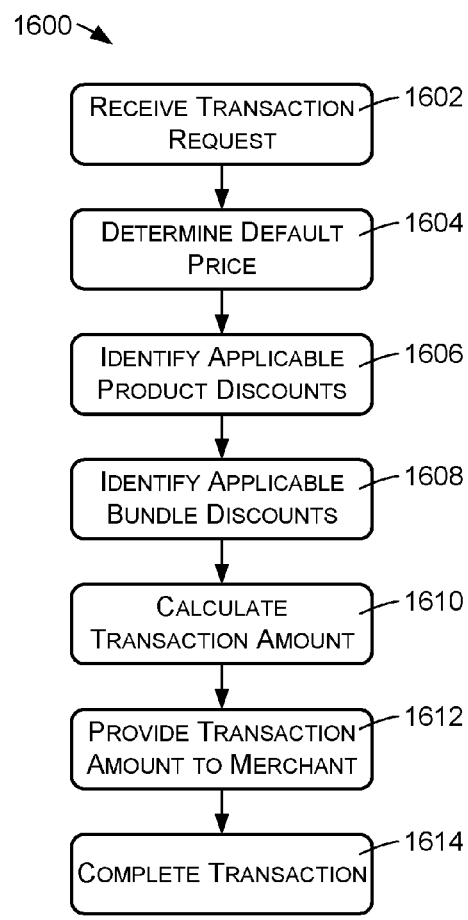
FIG. 15
FIG. 16

PRODUCT CATALOG SERVICES

CROSS REFERENCE TO RELATED APPLICATIONS

This application claims priority to U.S. Provisional Patent Application No. 62/248,874, filed Oct. 30, 2015, titled "Product Catalog Services," the entire contents of which are incorporated herein by reference.

BACKGROUND

Various types of business entities may interact with each other to sell and purchase products along a chain of commerce. For example, a first business entity may manufacture a product and sell the product to multiple distributers. Each distributor may purchase products from multiple manufacturers and may sell the products to multiple retailers. Each retailer may purchase products from multiple distributers and may sell the products to multiple consumers.

Often, each business entity maintains a computerized system that tracks inventory and provides point-of-sale functionality. In some cases, such an electronic database system may be used to set prices for individual products and to provide reports regarding sales and inventory for the business entity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 13 is a flow diagram illustrating an example method of providing an instance event report.

FIG. 14 is a flow diagram illustrating an example method for specifying prices of products and of determining transaction amounts for purchase transactions including the products.

FIG. 15 is a flow diagram illustrating an example method for specifying default prices and price reductions for one or more products.

FIG. 16 is a flow diagram illustrating an example method for processing a purchase transaction having products that are subject to price reductions.

DETAILED DESCRIPTION

Figure 1:
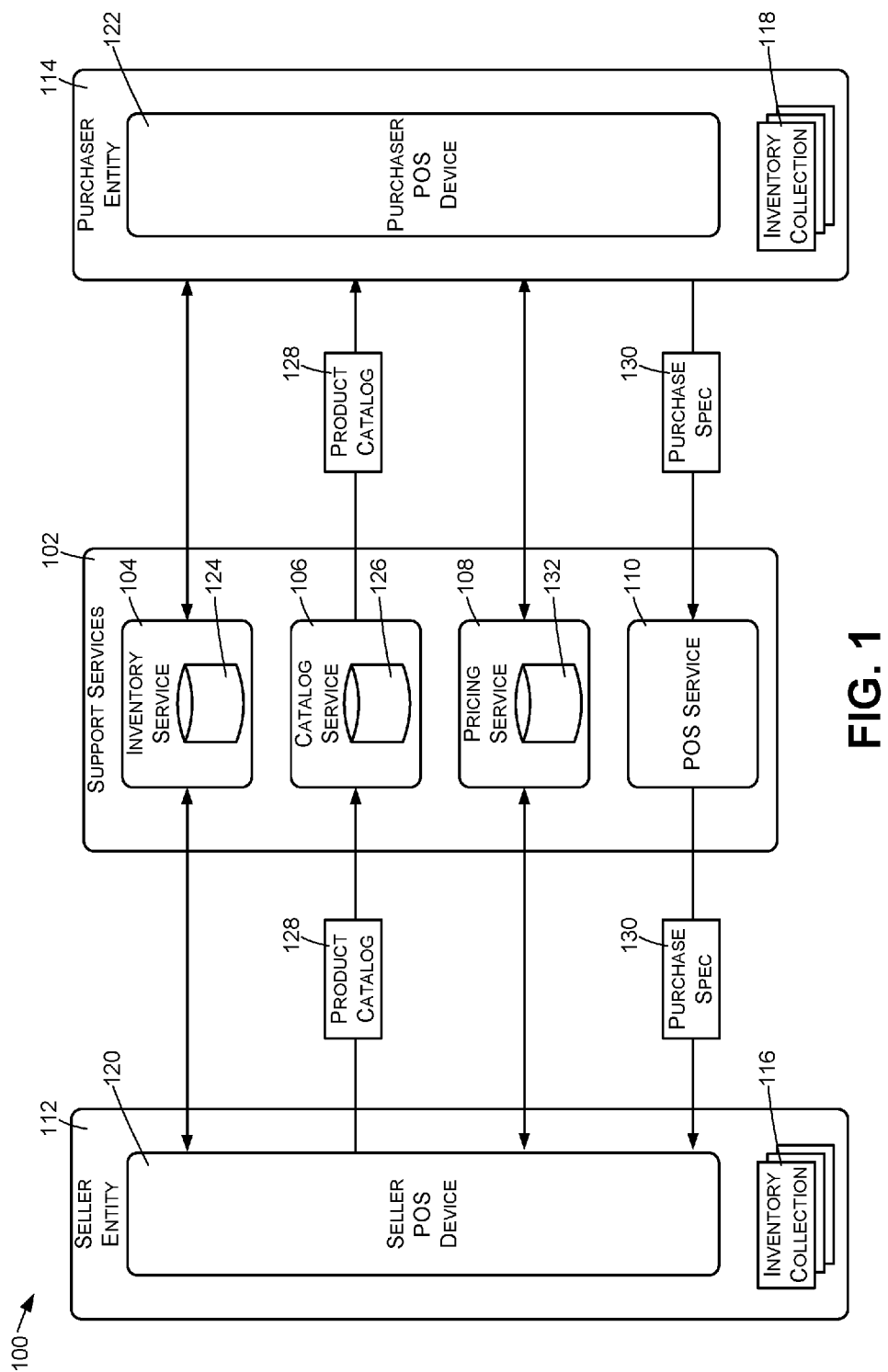
FIG. 1 is a block diagram illustrating an example environment in which business support services are provided to multiple business entities.

Described herein is a network-based system for providing and/or supporting merchant services including inventory services, product catalog services, pricing services, and point-of-sale (POS) transaction services. The system is implemented so that these services work in conjunction with each other, based on shareable product catalogs and other persistently stored information, to support a broad range of business entities.

The system supports the specification and creation of product catalogs by different business entities, where each product catalog specifies products that are available for sale by a particular business entity. The product catalogs can be shared to potential purchaser of the products and used to create purchase orders for the products. Furthermore, product descriptions and specifications from a published catalog can be imported for inclusion in the product catalogs of other business entities.

Each product catalog comprises product specifications corresponding respectively to the products available from the business entity. Each product specification of a product catalog may specify available variants of the corresponding product in terms of attribute values. The creator of the product catalog can arbitrarily specify attribute names and allowed values for each of the attributes, depending on the actual characteristics of a product family. For example, names might include "color" and "size." Allowed values for the "color" attribute may include "red" and "green." Allowed values for the "size" attribute may include "small," "medium," and "large." When selecting and purchasing products, the purchaser can select from allowed attribute values to specify particular product variants.

The system supports inventory tracking and reporting through an inventory service that tracks individual instances of a product as the instance moves through the business entities and locations of a product supply chain. Variant information is recorded for each product instance in terms of allowed attribute values. Current ownership, location, and sale-related events are also recorded over time, and such events are not limited to those involving any particular business entity. Rather, information regarding an individual instance of a product is accumulated over time to reflect activities and events regarding multiple entities of the chain of commerce.

Each product instance is associated with a unique instance identifier (ID), which is specified by a data record corresponding to the product instance. The instance ID may be physically or electronically associated with a physical instance of a product. For example, the instance ID may comprise a serial number that is engraved or printed on the product. Similarly, software, firmware, or non-volatile memory of a product may be configured to store a unique instance ID corresponding to each product instance.

The data record for a product instance is maintained indefinitely, for the lifetime of the product instance, and is updated to store information regarding lifetime events concerning the product instance. For example, the data record is updated to show the owner of the product instance over time, to show the location of the product instance over time, and to indicate other information regarding the product instance such as shipments, receipts, sales, returns, repairs, inquiries, etc. Tracking inventory on a per-item basis such like this allows the system to create reports that reflect detailed information regarding individual product instances over their passages through multiple locations and entities of a chain of commerce.

The system may provide inventory reports regarding products currently in the inventory of a business entity. An inventory report may indicate inventory counts based on the instance-based inventory data records described above. Furthermore, the system may provide an instance history report indicating events concerning an individual product instance over the lifetime of the product instance. For example, an instance history report may indicate the initial manufacture of the product instance, sale to and purchase by a distributor, movements between inventory locations of the distributor, sales to consumer, repairs to the product instance, returns of the product instance, etc.

Although the system maintains historical information concerning multiple business entities, privacy is ensured by a preventing a business entity from accessing or viewing private or sensitive information of other entities. For example, an item history report may be filtered to indicate only those events that occurred during ownership of a product instance by the entity that is requesting the item history report. Alternatively, entities of a product supply chain may agree to share certain event information with upstream and/or downstream entities in order to provide more insight into activities concerning the product instance.

The system also supports time-based and location-based promotional pricing of products. A business entity may specify a default price for a particular product as well as a temporary product discount. The product discount can be specified per product, for a specified time period and for a specified location of the entity. The entity may also specify more complex promotions involving bundled discounts, where discounts are given for purchases of specified bundles or collections of products. For example, a bundled promotion might specify that if a customer purchases three product instances, the fourth will be free. Bundled promotions can be specified to be effective in combination with single-product discounts.

The system supports point-of-sale (POS) operations in which inventory items may be scanned for inclusion in an electronic shopping cart or basket. The POS operations may include transferring funds for purchase transactions. The POS operations may use the pricing functionality mentioned above when determining transaction amounts for purchase transactions. Specifically, when determining the transaction amount for a purchase transaction, POS services may determine the default price for each product of the purchase transaction and may also identify any discounts that have been specified to be effective at the time of the purchase transaction. The POS services may apply available promotional discounts in a manner that minimizes the transaction amount.

The system retains historical information regarding products, offered prices of the products, product discounts, sales of individual product instances, actual selling prices of individual product instances, and so forth, which may be used for various types of reporting. For example, the system may provide reports regarding sales rates for different product variants. The system may also allow a business to determine historical selling prices of different products. Furthermore, the system may in some embodiments be configured to analyze global data regarding a product, such as data regarding sales of the product by multiple business entities, in order to provide a recommendation for current pricing of the product. For example, the system may analyze sales data from a previous year, over multiple merchants, to determine the most effective and/or profitable selling price of a product, accounting for projected sales rates, the cost of the product, and the selling price of the product. The system may similarly be configured to determine appropriate mixes of different variants of a product based on past sales rates of the variants.

FIG. 1 illustrates an example environment 100 in which support services 102 may be provided for business entities such as manufacturers, distributors, wholesalers, merchants, vendors, resellers, retailers, etc. Each supported business entity may at different times act as either a purchaser or a seller of products. For example, a merchant may act as a purchaser when purchasing products from a distributor and may act as a seller when selling the products to consumers or resellers. A distributor may similarly act as a purchaser when obtaining products from manufacturers and may act as a seller when selling the products to resellers.

Among other services that are not shown, the support services 102 may include a product inventory service 104, a product catalog service 106, a product pricing service 108, and a point-of-sale (POS) service 110. For purposes of illustration, the support services 102 are illustrated as providing services for a seller entity 112 and a purchaser entity 114. The seller entity 112 and the purchaser entity 114 may be referred simply as the "seller 112" and the "purchaser 114" in the following discussion. In some cases, the term "entity" may be used to refer to a business entity or to a person such as a consumer purchaser of products.

For purposes of the following discussion, the seller 112 is assumed to be providing products for sale and the purchaser 114 is assumed to be purchasing products from the seller 112. However, each of the entities 112 and 114 may in practice comprise a business entity that both purchases and sells products and that may act in the role of either seller or purchaser in any given transaction with other entities.

The seller 112 may maintain a product inventory collection 116 of products that have been manufactured or purchased and that are available for sale by the seller 112. Similarly, the purchaser 114 may maintain a product inventory collection 118 of products that have been manufactured or purchased and that are available for sale by the purchaser 114. The products of the inventories 116 and 118 may be physically located at the respective premises of the business entities or may be available under the control of the respective business entities.

The support services 102 may be implemented as a large-scale, network-based or "online" service that supports many business entities, who may be distributed across large geographic areas and may operate within respective business establishments. In some cases, the support services 102 may be available to business entities and consumers through pages of a website that are accessed by computing devices of the business entities, such as by computers, tablet computers, smartphones, or other devices that run an Internet browser or other graphical interface for accessing the website pages. In other cases, the support services 102 may expose network-accessible application programming interfaces (APIs) or other network-based interfaces that are accessible by special-purpose client software that runs on computing devices of the business entities.

In the described embodiments, the support services 102 and its sub-services 104, 106, 108, and 110 may be implemented by multiple server computers, which may include physical computers and virtual computers, and by software that is executed by the server computers. As one example, such server computers may be part of one or more computing centers, server farms or server clusters that are operated by a service provider and that include large numbers of server devices, each of which may be capable of implementing multiple virtual server instances. Responsibility for the functionality attributed herein to the support services 102 may be distributed and duplicated across the multiple servers and/or virtual server instances. In other embodiments, the functionality described herein as being provided by the support services 102 and its subservices 104, 106, 108, and 110 may be provided at least in part by other components, including computing devices of the business entities, which may comprise POS terminals and/or other devices that provide various types of POS functionality.

Generally, business entities use computer terminals of some sort to interact with the support services 102. Examples of suitable computer terminals include desktop computers, tablet computers, smartphones, various other types of portable devices, and/or dedicated or special-purpose devices having appropriate user input/output (I/O) capabilities such as keypads, touchpads, audio/voice interfaces, and/or graphics displays. Such computer terminals may also have scanners or other types of sensors for detecting things such as barcodes, radio-frequency identification (RFID) tags, and other tokens that identify physical product items. The computer terminals may also have scanners, readers, or other sensors for obtaining customer payment information. For example, the computers may include magnetic card readers, RFID readers, near-field communication (NFC) readers/writers, etc. In some cases, computer terminals used by business entities and supported by the support services 102 may enable mobile payments, such by allowing a retail customer to use a smartphone or other mobile device to pay for a purchase.

In FIG. 1, the seller 112 is illustrated as having a seller POS device 120, which is an example of a computer terminal that is supported by the support services 102. The purchaser entity 114 is illustrated as having a purchaser POS device 122, which again is an example of a computer terminal that is supported by the support services 102. In practice, each entity may have multiple computer terminals of various types. In some cases, different computer terminals and/or types of computer terminals may be used for different purposes within a business entity, such as for inventory management, catalog management, pricing management, and POS functionality. In other cases, a single device, such as a single POS device, may be used for all of this functionality.

The support services 102 may be implemented as Internet-based services, and the POS devices 120 and 122 may communicate with the support services 102 using the Internet. Various types of private and public networks may be used for communications between the POS devices 120 and 122 and the support services 102, including wired networks, wireless networks (e.g., Wi-Fi), cellular networks, etc. The POS devices 120 and 122 may also use close-range communication technologies such as Bluetooth®, Bluetooth® low energy, etc. for establishing network communications.

The discussion below may at times refer to interaction by a business entity with the support services 102 or one of its sub-services. It is to be understood that such interaction is performed through the POS device or other computer terminal of the business entity. For example, such interaction may be performed through a browser-based interface of the POS device or through dedicated and special-purpose software running on the POS device or other computer terminal of the business entity. Interactions attributed to a business entity are understood to include interactions with a human operator or member of the business entity or a person acting on behalf of the business entity. Interactions may also be with automated systems of the business entity.

Both the seller 112 and the purchaser 114 may interact with the inventory service 104 to specify items that are currently in the inventory collections 116 and 118, respectively, of the seller 112 and the purchaser 114. The inventory service 104 may include an inventory record store 124 that contains data records corresponding to the products in each inventory collection.

In the following discussion, the terms "product" and "product family" will be used to indicate a particular brand, model, and/or type of item. For example, a product family may comprise pants of a particular style, manufactured by a particular manufacturer. As another example, a product family may comprise cars of a particular brand and model. The term "product instance" will be used to indicate a single item of a product or product family, such as single car having a particular serial number.

In certain embodiments, the inventory service 104 may store information regarding each instance of a product. In order to facilitate this, each product instance is associated with a globally unique instance ID that uniquely identifies the product instance from all other instances of the product. As one example, an instance ID might comprise a serial number, and the serial number may be permanently printed or engraved on the product. As another example, each product instance may have an attached barcode indicating a globally unique instance ID. As yet another example, each product instance may have an attached or integrated radio-frequency identification (RFID) tag that contains a unique instance ID. The instance ID may be an alphanumeric or binary code of a sufficient length so that no two product instances have the same instance ID. In some cases, each instance ID may be globally unique that is unique across all product instances of all product families.

In some embodiments, the inventory service 104 may also allow different business entities to associate their own product instance IDs with products. For example, each business entity may have its own instance ID scheme, and may assign an arbitrary, entity-specific instance ID to each product instance. The entity-specific instance ID may be linked to the globally unique instance ID by the inventory service 104, and may be considered to be a local or entity-specific alias of the globally unique instance ID.

In certain embodiments, the inventory store 124 comprises one or more database tables containing an instance record for each instance of a product. The instance record corresponding to a particular product instance is persistent indefinitely and over the life of the product instance, even as the product instance moves from the inventory collection of one business entity to the inventory collection of another business entity. Furthermore, rather than replacing information indicated by an instance record, new information is repeatedly added to the instance record while retaining previously added information. For example, when a particular product instance is sold and transferred from the seller 112 to the purchaser 114, new data is added to the single instance record indicating the sale and transfer, rather than replacing older information. Thus, a single instance record is used to collect information regarding the progress of a product instance through a chain of commerce, despite the movement of the product instance among various business entities.

The instance record corresponding to a particular product instance may indicate such things as date of manufacture, date and sale price for each sale and transfer of the product instance between business entities, location movements of the product instance within a particular business entity, date and sale price for a consumer purchase of the product instance, returns of the product instance, repairs to the product instance, help calls and other support incidents regarding the instance, and any other instance-specific information that might be available through the POS devices of the entities 112 and 114 or other sources.

The inventory service 104 may analyze data regarding multiple product instances to create reports regarding aggregate inventories, such as aggregate counts of the instances of each product family In addition, a business entity may query the inventory service 104 to obtain an event history for a particular product instance, showing the progress and movement of the product instance through a chain of commerce. The inventory service 104 may also support inventory planning by comparing planned inventory levels with actual inventory levels. Data maintained by the support services 102 is subject to a permission system in which only selected data that is relevant to a particular business entity is presented in reports to the business entity. Unless an entity grants permission, information generated and provided by that entity is not accessible or viewable by other entities.

The catalog service 106 may be used by both the seller 112 and the purchaser 114 for various purposes. The catalog service 106 has a catalog store 126 in which it stores multiple product catalogs, which may be provided by multiple business entities. FIG. 1 shows a product catalog 128 that is provided by the seller 112 for storage in the catalog store 126. The product catalog 128 specifies multiple product families that are available for purchase from the seller 112. The catalog service 106 may receive and store product catalogs from many different sellers, and may publish the product catalogs for use by many different purchasers. The term "publish" is used to indicating making the catalogs available for access and use by one or more other entities.

FIG. 1 shows the product catalog 128 being provided to and obtained by the purchaser 114. The purchaser 114 may use the product catalog 128 for various purposes, such as purchasing, inventory management, inventory planning, POS support, pricing support, and so on. The purchaser 114 may also create its own product catalog, which may include and/or reference product families that have been specified by the seller's product catalog 128.

In certain embodiments, the catalog service 106 may allow sellers to define product families having multiple product variants. For example, a particular shirt may be available in multiple sizes, each of which is considered to be a different product variant. As another example, a pair of pants may be available in multiple waist sizes and multiple inseam lengths, wherein each combination of waist size and inseam length is a unique product variant. A car model may be available with different engines, with different interior options, with different colors, etc.

The product catalog may specify product family attribute names such as "size," "color," etc., and may also specify allowed values for each of the attributes. For example, the size attribute may have allowed values of "small," medium," and "large." The color attribute may have allowed values of "red," "black," and "blue." Each seller can define its own product families, product variants, attribute names, and allowed attribute values.

The purchaser 114 may obtain the product catalog 128 and may select or specify individual product variants from the product catalog 128. For example, the purchaser 114 may create a purchase specification 130 by selecting a particular product family, selecting a combination of attribute values corresponding to a variant of the product family, and specifying a quantity of the variant.

In an example scenario, the seller 112 may receive the purchase specification 130 from the purchaser 114, wherein the purchase specification 130 specifies product variants in terms of attribute names and attribute values defined by the product catalog 128. In response to receiving the purchase specification 130, the seller 112 may deliver instances of the specified product variants to the purchaser 114. The purchaser may scan incoming product instances, and the inventory service 104 may update its data store 124 to indicate that the product instances are now in the inventory of the purchaser. Updated inventory records may reference the product catalog 128 to indicate the product and product variant of each received product instance.

The pricing service 108 may be used to specify prices for product families, to determine sale prices at the time of sale, to implement current and scheduled product promotions, and to receive suggestions and recommendations regarding pricing of different product families. The pricing service 108 may have a pricing store 132 that stores pricing records indicating various types of pricing information. As one example, the pricing service 108 may store a default selling price for each product family that is indicated by the inventory service 104 as being in the inventory collection of the seller 112. As another example, the pricing service 108 may store data records indicating temporary pricing promotions for product families in the inventory of the seller.

The point-of-sale (POS) service 110 supports POS operations of individual business entities. The POS service 110 may support creation of a purchase specification, such as a shopping cart or purchase order, that specifies products or product variants in the inventory collection of a seller. The shopping cart and purchase order functionality may reference the inventory service 104, the catalog service 106, and the pricing service 108 to determine current inventory levels, to present appropriate options for selecting product attributes, and for presenting current prices of offered products and product variants.

Figure 2:
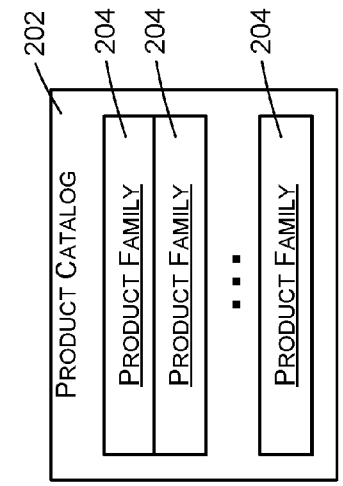
FIG. 2 is a block diagram of an example product catalog such as may be used in the environment of FIG. 1.

FIG. 2 illustrates an example of a product catalog 202, of which the product catalog 128 of FIG. 1 may be an example. The product catalog 202 comprises multiple product family specifications 204, which may be represented by data records stored in the catalog store 126. In addition to the product family specifications 204, the product catalog 202 may include additional data and/or metadata, not shown, such as data indicating the creator or owner of the product catalog 202, the date the product catalog 202 was created or updated, permissions or rules indicating which other business entities are allowed to see the product catalog 202, etc. Details regarding the composition of a product family specification 204 will be described below with reference to FIG. 3. Although not shown, the product catalog 202 may also specify products that do not belong to product families such as products that do not have multiple variants.

Figure 3:
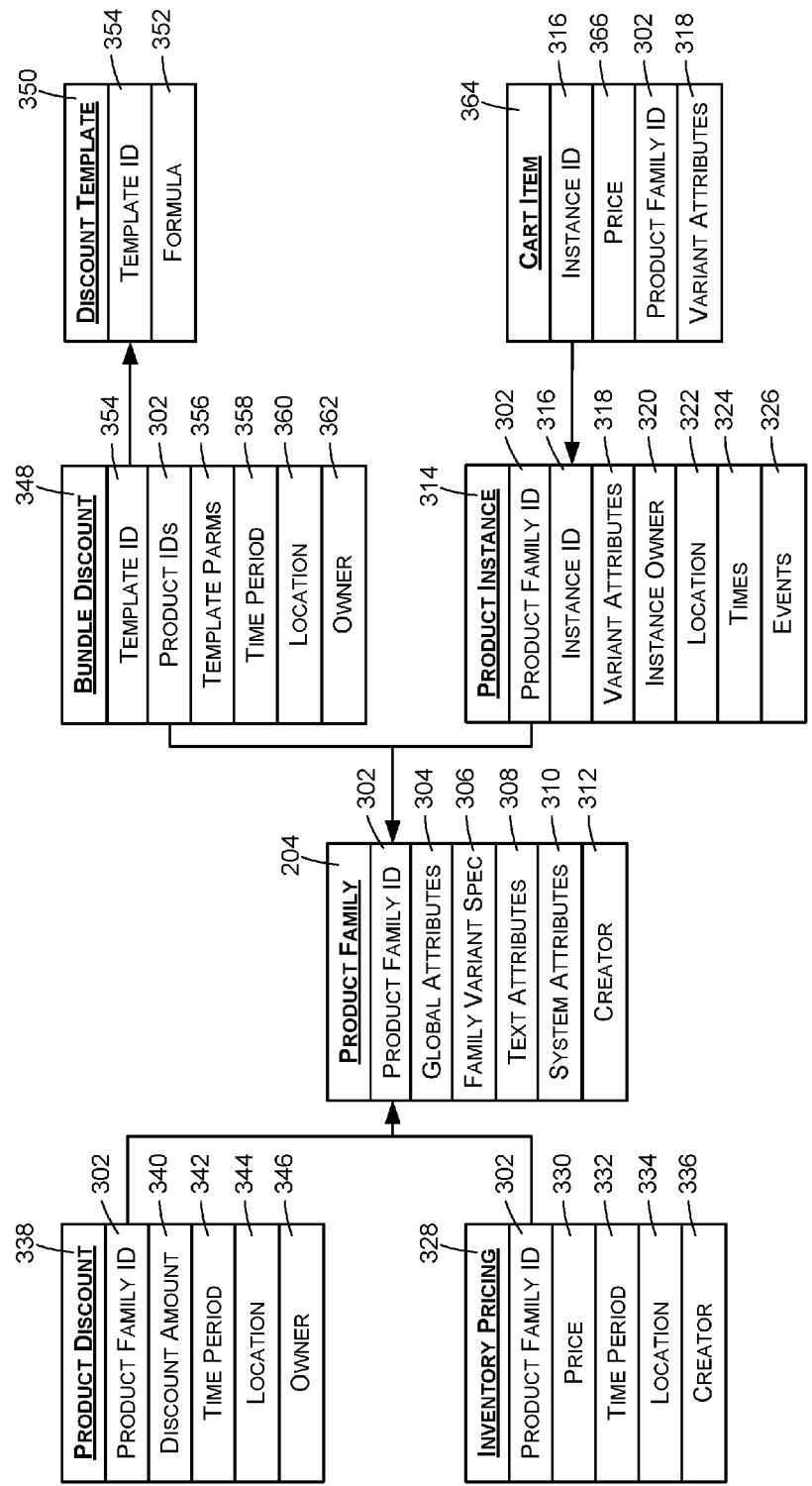
FIG. 3 is a block diagram showing example data objects and their relationships.

FIG. 3 illustrates an example of data structures that may be used by the support services 102 to maintain data used by the inventory service 104, the catalog service 106, the pricing service 108, and the POS service 110. In the following discussion, the term "data record" will be used to indicate data corresponding to a particular object. A data record may be embodied in various ways in different embodiments. In some cases, a data record may be stored by a relational database, and may include data from multiple tables, queries, fields, entries, etc. of such a relational database. FIG. 3 shows examples of discrete data records and their interrelationships. The support services 102 may store many such data records that are supplied by multiple different business entities regarding product families and product instances.

The catalog service 106 stores multiple product family specifications 204. Each product family specification 204 forms a data record of a product catalog provided by a business entity, such as the product catalog 202. Each product family specification 204 represents and specifies a product family, including available product family variants, that is in the inventory collection of the business entity and/or that is available for sale by the business entity.

A product catalog created by and received from a first business entity may be published and shared with other business entities. The other business entities may purchase products using the product catalog and/or may create their own catalogs using the product family specifications of the product catalog. As an example, a manufacturer of a product may create a product family specification 204 to specify a particular manufactured product that is available for sale to other business entities. Downstream entities in a chain of commerce may purchase the product represented by the product family specification 204 and may copy or reference the same product family specification 204 to designate a product for inclusion in catalogs of the downstream entities. The original product family specification 204 may also be used by the downstream entities for their own inventory management, pricing, and shopping cart functionality. Rather than copying the product family specification 204, the downstream entities may instead reference the existing product family specification 204.

Each product family specification 204 comprises a product family ID 302 that corresponds uniquely to the represented product family and that distinguishes the product family from all other product families. As one example, the product family ID 302 may comprise a universal product code (UPC), a stock keeping unit (SKU), a global trade item number (GTIN), or some other type of code corresponding to the product family. All instances and variants of the product family may share the same product family ID 302.

Each product family specification 204 may specify one or more global attribute values 304 such as a product name and textual description of the product. Global attributes are those attributes that predefined by the catalog service 106 and that are used to describe many or all types of product families Each product family specification 204 may specify a different value for each global attribute, such as a different title or different product description.

Each product family specification 204 may also comprise a family variant specification 306, which comprises data specifying or defining multiple available variants of the product family represented by the product family specification 204. Further details regarding the family variant specification 306 will be discussed with reference to FIG. 4.

Each product family specification 204 may further specify one or more text attributes 308. A text attribute may comprise an attribute name and a corresponding attribute value, which may be supplied by the creator of the product family specification 204 as appropriate for a particular product family.

Each product family specification 204 may also comprise one or more system attributes 310. Generally, any of the attributes described above as being part of the product family specification 204 may be designated as system attributes. A system attribute is one that has a known meaning to the support services 102 and that causes the support services 102 to take an action based on the value of the system attribute. The product family ID is an example of a system attribute. Other examples include barcodes, UPCs, category labels, etc.

The product family specification 204 may also include a creator ID 312 indicating the original creator and/or owner of the product family specification 204.

The product family specification 204 may include other data and/or metadata that is not shown, such as one or more catalog IDs indicating product catalogs of which the product family specification 204 is a part, a date indicating the date the product family specification 204 was created and/or updated, and so forth.

The inventory service 104 stores multiple product instance data records 314, each of which corresponds to and comprises information relating to a specific product instance of the product family represented by the product family specification 204. Each product instance data record 314 includes the product family ID 302 of the product family specification 204, indicating the product family of which the product instance is a member. Although only one product instance data record 314 is shown in FIG. 3, multiple product instance data records 314 may specify the same product family ID 302 and may therefore correspond to the same product family specification 204. Such multiple product instance data records 314 correspond respectively to multiple product instances.

Each product instance data record 314 may also comprise an instance ID 316, which may comprise a globally unique identifier corresponding to the product instance that the product instance data record represents. The instance ID 316 may comprise a serial number or other unique identifier associated with the product instance represented by the product instance data record 314. The instance ID 316 may be affixed in some manner to the product instance such as being printed or engraved on or by being electronically embedded in the product instance (i.e., by use of an RFID tag or other electronic token). In some cases, the instance ID 316 may be embedded in software of the product instance or stored by non-volatile data memory of the product instance.

Each product instance data record 314 may also comprise or specify a variant value set 318 that specifies the variant of the product instance in terms of its attributes. The variant value set 318 comprises attribute values that correspond to and define a particular product variant. In particular, the variant value 318 comprises a value for each of the attribute specifications 402 that are described below with reference to FIG. 4.

Each product instance data record 314 may also specify the current owner 320 of the product instance, which may be a business entity or may in some cases be a different entity such as a consumer purchaser of the product instance corresponding to the product instance data record 314. The product instance data record 314 may also specify a current location of the product instance, such as one of multiple facilities of a business entity.

The product instance data record 314 may specify multiple owners 320 and locations 322, along with corresponding times or time periods 324. For example, the product instance data record 314 may indicate a series of owners of the corresponding product instance and the time period that each owner owned or had possession of the product instance. Similarly, the product instance data record 314 may indicate a series of locations (such as warehouses or retail stores) at which the product instance was located and the times or time periods during which the product instance was at those locations. The product instance data record 314 may include other time-based data that is not shown in FIG. 2.

The product instance data record 314 may more generally specify historical events 326 regarding the product instance represented by the product instance data record 314. Events may include things such as sales, sale prices, location changes, repairs, returns, etc., as well as the dates of the events. Each historical event 326 may indicate the nature of the event such as a description of the event or a code corresponding to the type of the event, the date of the event, the location of the event, and other information or data relating to the event. For example, an event relating to a sale may indicate the price for which the corresponding product instance was sold. Similarly, an event relating to a purchase may indicate the price for which the corresponding product was purchased. Each event 326 may further indicate the entity or entities involved in the event, such as the parties of a transaction event.

A product instance data record 314 is created for every product instance. Because the recorded events include past events, product instance records can be queried to obtain many types of detailed and aggregate historical information regarding product sales and other activities. For purposes of reporting, historical events can be categorized by product, by entity, by event type, by event location, by event date, by product variant, etc.

The pricing service 108 stores multiple inventory pricing data records 328 relating to pricing of the product families represented by the corresponding product family specifications 204. Each inventory pricing data record 328 includes the product family ID 302 of the product family specification 204, indicating the product family to which the pricing data record 224 applies. Although only one pricing data record 328 is shown in FIG. 3, multiple pricing data records 328 may specify the same product family ID 302 and may therefore correspond to the same product family specification 204. The different pricing data records 328 may apply to different time periods and may be provided by and/or for different business entities, so that different pricing schemes may be used at different times and by different business entities for the same product families. In addition, a single business entity may provide different pricing data records 328 for different retail or geographic locations.

The pricing data record 328 specifies a default selling price 330 and an effective time period 332 during which the default price 330 is to be effective. The effective time period 332 may comprise a current time period or a future time period. The pricing data record 328 may also specify a location qualifier 334 indicating one or more locations at or for which the default price 330 is to be applicable. The location qualifier 334 may indicate one or more retail locations or other facilities of a business entity and/or a geographic area. The location qualifier 334 allows a seller to specify different prices for different stores and/or geographic areas.

The pricing data record 328 may also comprise a creator or creator ID 336, indicating the business entity that created the pricing data record 328 and to whose products the indicated pricing will be applicable. Once created, multiple pricing data records 328 are stored by the support services 102 indefinitely as a historical record of offering prices for the various product families represented by the product family specifications 204.

The pricing service 108 may store multiple product discount data records 338 that specify temporary promotional discounts for certain products represented by the product family specifications 204. Each product discount data record 338 includes the product family ID 302 of the product family specification 204, indicating the product family to which the product discount data record 338 applies. Although only a single product discount data record 338 is shown in FIG. 3, multiple product discount data records 338 may specify the same product family ID 302 and may therefore correspond to the same product family specification 204. The different product discount data records 338 may apply to different time periods and may be provided by and/or for different business entities, so that different promotional schemes may be used by different business entities for the same product families, during different time periods, and at different locations.

The product discount data record 338 specifies a discount amount 340 and a time period 342 during which the discount amount 340 is to be effective. The discount amount 340 may be specified as an absolute amount or as a percentage of the default price 330 of the product family. The time period 342 may comprise a current time period or a future time period. The product discount data record 338 may also specify a location qualifier 344 at or for which the discount amount is to be applicable. This allows a seller to specify different discount amounts for different stores and/or geographic areas. The product discount data record 338 may also comprise a creator or creator ID 346, indicating the business entity that created the product discount data record. Once created, multiple product discount data records 338 are stored by the support services 102 indefinitely as a historical record of discounts offered for the various product families represented by the product family specifications 204.

The pricing service 108 may store multiple bundle discount data records 348 that specify bundled product promotions for certain products represented by the product family specifications 204. The bundle discount data records 348 may be used in conjunction with sales promotions, including promotions involving bundles or combinations or products. For example, a bundled sales promotion might involve a pricing scheme in which a percentage discount is offered for purchase of at least a predefined number of certain products or product categories. As a more specific example, a bundled pricing scheme might specify that a purchaser of three instances of a certain product family or product category may receive a third item at a 30% discount.

The bundle discount data record 348 may reference a discount template 350 that specifies a discount formula 352. The formula 352 may define logic for a bundled discount. Examples of formulas 352 include:

Purchase X instances of product Y to receive a Z discount on all additional instances;

Purchase X instances of a product category Y to receive a Z discount on all additional instances of the product category Y;

Purchase at least X dollar amount of a product X to receive a Z discount on a product Y.

These of course are merely examples, and different templates 350 may specify different formulas. Discounts may be specified as dollar amounts or as percentages. In some cases, the discount templates may be created and provided by the support service 102. In other cases, the discount templates 350 may be created by individual business entities.

The discount template 350 may have an associated template ID 354, and the bundle discount data record 348 may reference the template ID 354. The bundle discount data record 348 may specify multiple product family IDs 302, indicating products to which the specified bundle discount is applicable. In addition, the bundle discount record 348 may specify various template parameters 356, corresponding to variables of the formula 352. For example, such template parameters may indicate a category of products to which the formula applies, discount amounts, purchase thresholds, etc. In some cases, the product family IDs 302 of the bundle discount data record 348 may be specified by a filter, rule, or query that specifies characteristics of the products that are to be included in the bundle discount. For example, a query may be used to determine product family IDs of all products of a certain category.

Although only a single bundle discount data record 348 is shown in FIG. 3, multiple bundle discount data records 348 may specify different promotions, involving the same and/or different products. The different bundle discount data records 348 may apply to different time periods and may be provided by and/or for different business entities, so that different promotional schemes may be used by different business entities for the same product families, during different time periods, and at different retail or geographic locations.

The bundle discount record 348 may specify a time period 358 during which the specified bundle discount is to be effective. The time period 358 may comprise a current time period or a future time period. The bundle discount record 348 may also specify a location qualifier 360 indicating one or more locations or geographic areas for which the discount amount is to be effective. This allows a seller to specify different bundle discount promotions for different stores and/or geographic areas. The bundle discount data record 348 may also comprise a creator or creator ID 368, indicating the business entity that created the bundle discount record 348 and to whose product the bundle discount record 348 will apply. Once created, multiple bundle discount records 348 are stored by the support services 102 indefinitely as a historical record of discounts and promotions offered for the various product families represented by the product family specifications 204.

The POS service 110 may create cart items 364, each of which may specify a product variant and/or instance that a purchaser wants to purchase. For example, a purchase, purchase specification, or electronic shopping cart might comprise multiple cart items. Each cart item 364 may specify a product variant that is to be purchased. In some cases, the cart item 364 of a purchase transaction may be created by recording instance IDs 316 of product instances that a consumer or other purchaser has selected from a physical inventory collection, such as from a shelf of a brick-and-mortar store. For example, each product instance may be "scanned" at customer checkout to read a barcode or RFID tag associated with the instance and to thereby determine the instance ID 316 of the product instance. Using the instance ID 316, the POS service 110 can reference the corresponding product instance data record 314 to determine the variant value set 318 of the product instance. The POS service 110 can further use the product family ID 302, found in the product instance data record 314, to reference the appropriate inventory pricing data record 328 and to determine the current price 366 of the product instance.

In other cases, the cart item 364 may be created in response to a purchaser selecting items from an electronic storefront such as a website. In this case, the purchaser may not have selected a product instance, but may instead have selected a product family with a corresponding product family ID 302, and specified variant value set 318 corresponding to a specific product variant. The POS service 110 may use the product family ID 302 to reference the appropriate inventory pricing data record 328 and to determine the current price of the product. The POS service 110 may also search the product instance records 314 to ensure that current inventory collection includes an instance of the selected product variant. Upon shipping or otherwise providing the product instance to the purchaser, the support service 102 may record the instance ID 316 of the actual product instance provided to the purchaser, and the instance ID 316 may at that time be added to the cart item 364.

In some cases, the current sale price 366 may be determined based on the inventory pricing data record 328 corresponding to the product family ID 302, one or more item discount data records 338 corresponding to the product family ID 302, and one or more bundle discount data records 348 corresponding to the product family ID 302. In cases where more multiple item discount data records 338 and/or bundle discount records 348 are applicable to a product variant or instance specified by the cart item 364, the pricing service 108 may apply all of the available and applicable discounts in a manner that achieves the lowest possible total transaction amount.

The support service 102 stores the data records described above and shown in FIG. 3 for multiple merchants, for multiple product families, for multiple product instances, for multiple purchase transactions, and for multiple other events. The records are stored indefinitely to create a historical record regarding each product family and each instance of each product family Combined, the records described above can be used to report on sales of product families, sales of individual product variants, the dates of the sales, the price for which each product instance was sold, the location from which each product instance was sold, the attributes of each sold product instance, offering prices for different product families over time, sales rates for product families and product variants over time, and so forth.

Although the information shown in FIG. 3 is stored for many business entities, and is stored persistently as ownership of product instances passes between business entities, a permission system may be implemented by the support service 102 so that a particular business entity has a view of only the data relating to its own operations and any other data to which it has been granted viewing privileges by other entities. For example, when viewing information from the product instance specification 314, a business entity may be allowed to see only those events 326 that involved the business entity and/or that occurred during a time period in which the corresponding product instance was in the inventory collection of the business entity. Similarly, information from an inventory pricing data record 328 may be made visible to a business entity only when the inventory pricing data record 328 has been created by the business entity itself; information from the item discount data record 338 may be made visible to a business entity only when the item discount data record 338 has been created by the business entity itself; and information from the item bundle data discount record 348 may be made visible to a business entity only when the bundle discount data record 348 has been created by the business entity itself. The cart items 364, similarly, are visible only to the merchant whose sales the cart items represent.

Figure 4:
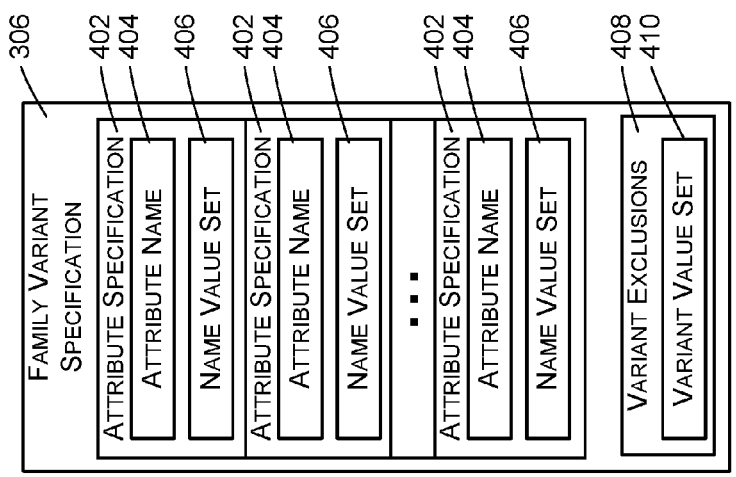
FIG. 4 is a block diagram of an example family variant specification.

FIG. 4 illustrates an example data structure of a family variant specification 306 such as is shown as being part of the product family specification 204 of FIG. 3. The family variant specification 306 in this example comprises a plurality of product attribute specifications 402, each of which is defined by an attribute name 404 and a corresponding name value set 406. Each attribute name 404 corresponds to an attribute of the product family represented by the product family specification 204. Each name value set 406 comprises allowed values for the attribute.

A business entity may create any number of attribute specifications 402 for inclusion in the product family specification 204. Attribute specifications 402 may represent or correspond respectively to variable characteristics of a product, such as size, color, style, model, etc. As an example, one attribute specification 402 may have an attribute name "size" and may have allowed values of 30, 32, 34, and 36. Another attribute specification 402 may have an attribute name "color" and may have corresponding allowed values of "red," "green," and "blue." The business entity that creates the product family specification 314 provides the attribute names 404 and the corresponding name value set 406.

The family variant specification 306 specifies the various attributes of a product family and the available values for each attribute. Based on the family variant specification 306, it is possible to specify a single available variant in terms of the values of the name value sets 406. Specifically, a single product variant may be designated by specifying a variant value set, which comprises a single value from each name value set 406 of the variant specification 306. With reference to FIG. 3, the variant value set 318 is an example of such a variant value set.

In some situations, it may be that certain combinations of allowed attribute values do not correspond to actual product variants. As an example, suppose that pants have waist size and inseam length as attributes. In this example, the combination of a 28-inch inseam and a 44-inch waist size may not correspond to an available product instance. In order to account for combinations of attribute values that do not correspond to available product instances, the family variant specification 306 may comprise one or more variant exclusions 408. Each variant exclusion 408 specifies a disallowed variant value set 410, comprising an attribute value from each of the name value sets. Attribute sets corresponding to disallowed variant attribute value sets are not allowed to be selected, specified, or otherwise used when specifying products from a product catalog.

Figure 5:
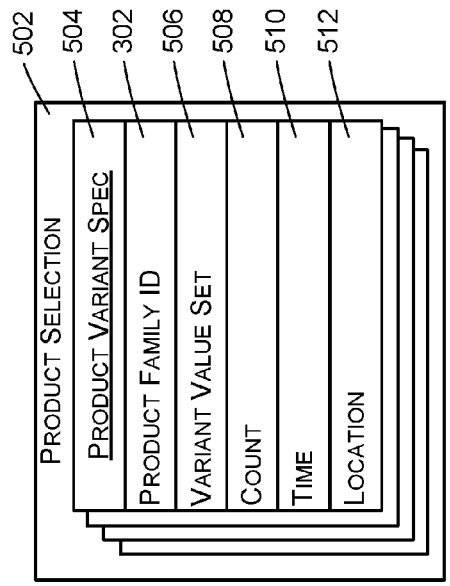
FIG. 5 is a block diagram of an example product selection.

FIG. 5 illustrates an example data structure of a product selection 502, which may be used to identify multiple product instances. For example, a product selection 502 may be used to specify multiple product instances for purchase. As another example, a product selection 502 may be used to indicate products that are to be contained in an inventory collection of a business entity.

The product selection 502 comprises multiple product variant specifications 504. Each product variant specification 504 specifies and represents a corresponding product variant. In order to specify a product variant, each product variant specification 504 comprises the product family ID 302 of a particular product family specification 204. The product variant specification 504 also comprises a variant value set 506, containing an attribute value corresponding to each of the attribute specifications 402 and/or attribute names 404 of the family variant specification 306. The product variant specification 504 may also specify a count 508, indicating a quantity of the product variant specified by the product family ID 302 and variant value set 506. As an example, the count may indicate how many of the product variant are being purchased or how many of the product variant are to be stocked in an inventory collection. In some cases, the product variant specification 504 may include a time period 510, indicating, as an example, time of a sale or a planned time or time period during which the represented product variant is to be obtained or stocked. The product variant specification 504 may also indicate a location 512, such as the location from which the product variant was sold or the location at which a planned product variant is to be stocked.

Figure 6:
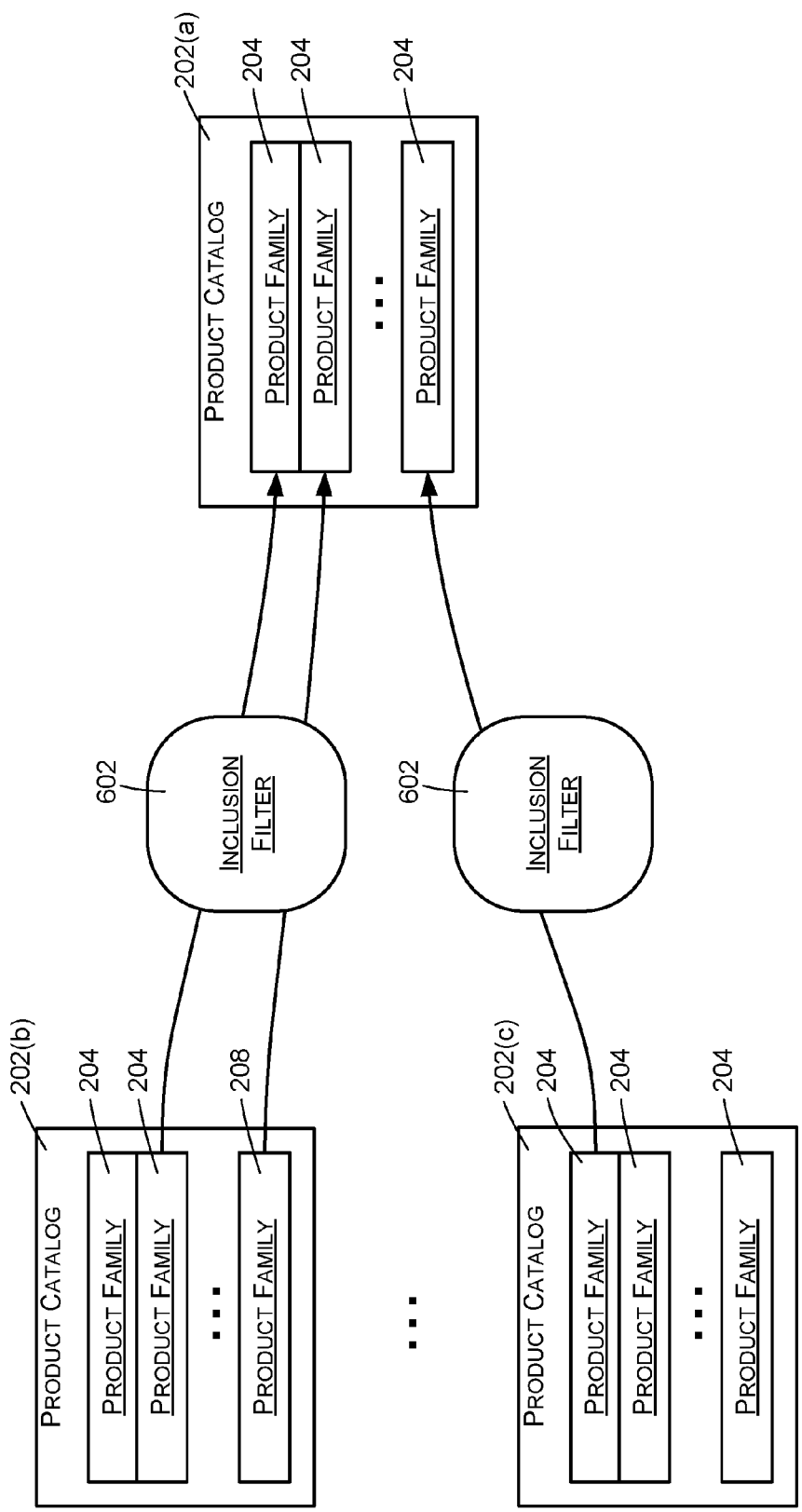
FIG. 6 is a block diagram showing relationships between different product catalogs.

FIG. 6 illustrates a product catalog 202(a) that is created using the product family specifications of other product catalogs 202(b) and 202(c). In this example, a first business entity may create the product catalog 202(a) to contain products obtained from second and third business entities, which have previously published the product catalogs 202(b) and 202(c), respectively. As an example, the support service 102 may publish the catalogs 202(b) and 202(c) and the first business entity may select product families that are to be represented in the product catalog 202(a). As another example, the product family specifications 204 may be automatically added to the product catalog of the first entity when the corresponding product instances are received from the second and third business entities and moved into the inventory collection of the first business entity. In some cases, the first business entity may scan or enter the instance IDs of received products. The instance IDs may be provided to the inventory service 104, which may use the associated product family IDs to locate the product family specifications 204 for the received products, and which may then automatically add the product family specifications 204 to the product catalog 202(a) of the receiving business entity.

In some embodiments, the product catalog 202(a) may be constructed by selecting individual product families of the other catalogs 202(b) and 202(c). In FIG. 6, selections of product families are specified by an inclusion filters 602 corresponding respectively to each of the other catalogs 202(b) and 202(c). Each inclusion filter 602 may specify the products of another business entity that the first business entity wishes to provide for sale. The product catalog 202(a) of the first business entity may therefore comprise products from multiple other business entities, as specified by the inclusion filters 602. Furthermore, when creating a graphical product catalog, such as for presentation on a website of the first business entity, product details may be obtained from the product catalogs 202(b) and 202(c) of the other business entities.

Figure 7:
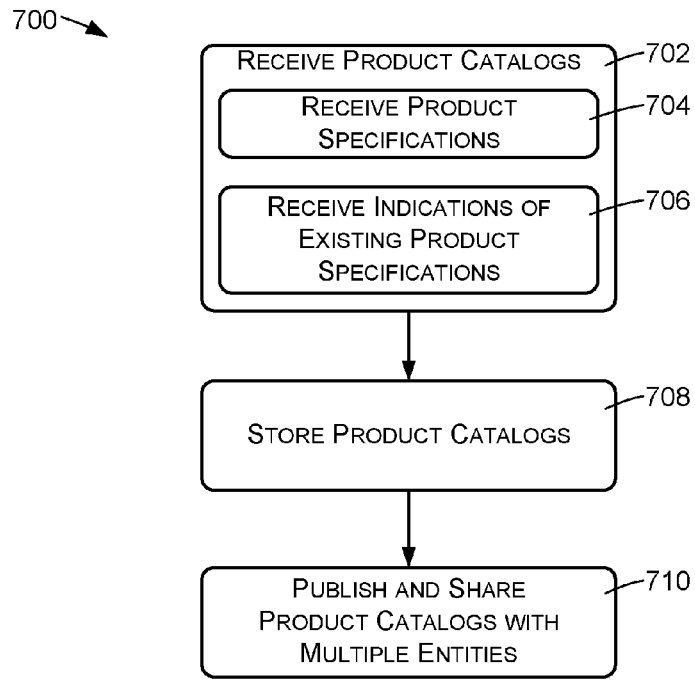
FIG. 7 is a flow diagram illustrating an example method of receiving and publishing product catalogs.

FIG. 7 illustrates an example method 700 of receiving, publishing, and sharing product catalogs. An action 702 comprises receiving multiple product catalogs from multiple business entities. The product catalogs may be received from business entities that manufacture products, business entities that sell products, business entities that purchase products, and business entities that rent or lease products. The product catalogs may specify multiple products available from the respective business entities and/or multiple products that are in the inventory collections of the respective business entities. The product catalogs may specify product families and may further specify variants of the product families as described above.

In some cases, the action 702 may comprise an action 704 of receiving and storing multiple product family specifications, corresponding respectively to different products of the product catalog 202. For example, when creating a product catalog, an entity may interact with a user interface component of the catalog service 106 to supply data for the product catalog and its product family specifications.

The action 702 may additionally or alternatively comprise an action 706 of receiving indication of existing product family specifications, such as product family specifications that have been created by other business entities and provided as parts of other product catalogs.

An action 708 comprises storing data representing the indicated product catalogs, which may include product family specifications as already described. The product catalogs may be stored on a server or server facility for access by the entities that provided the product catalogs as well as for access by other entities that may wish to order from the catalogs or to use the catalogs for other purposes. The action 708 may comprise creating and storing data records corresponding respectively to the product catalogs and their product specifications.

An action 710 comprises publishing and/or sharing the product catalogs with multiple entities other than the entities that provided the product catalogs. For example, the product catalogs may be shared with potential purchasers of products described by the product catalogs. As another example, the other entities may use product specifications of the published catalogs to create new product catalogs. Generally, the product catalogs and the associated or included product family specifications may be used for multiple purposes, including purchasing, inventory control, catalog creation, etc.

The method 700 may be performed repeatedly over time to receive and store product catalogs from different entities. For example, the method 700 may be performed a first time to receive a product catalog and corresponding product specifications from a first seller. The method 700 may be performed a second time to receive a product catalog from a second seller. The second seller may specify the second product catalog by providing data indicating new product family specifications and/or by referencing product family specifications from other product catalogs that have been created and supplied by other sellers such as the first seller.

Figure 8:
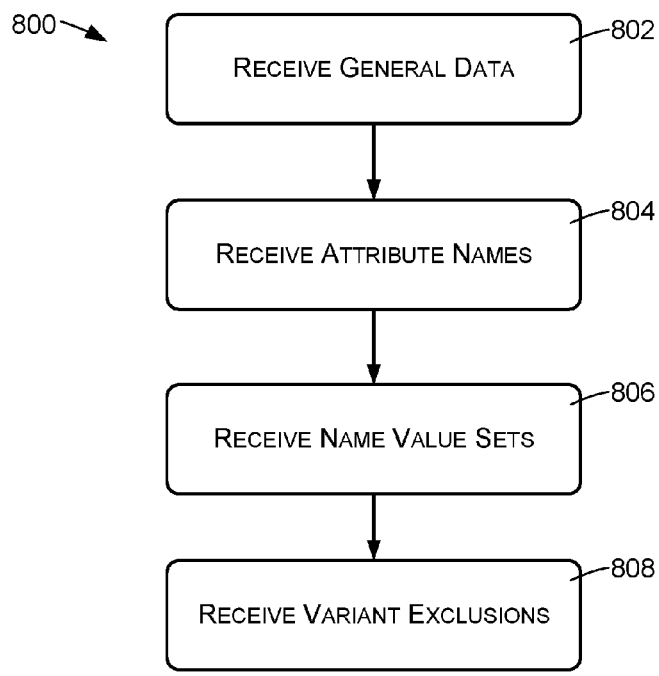
FIG. 8 is a flow diagram illustrating an example method of indicating a product family specification.

FIG. 8 illustrates an example method 800 of creating a product family specification 204, such as may be included in a product catalog 202, and such as may correspond to a particular product. The catalog service 106 may perform the actions of FIG. 8 by interacting with a human operator who is a member of the business entity, through a graphical interface or other interface using a POS device of the business entity or other computer equipment of the business entity.

An action 802 comprises receiving general data regarding the product, such as a name of the product, a description of the product, and a unique product family ID corresponding to the product. In some cases, the catalog service 106 may create the unique product family ID.

An action 804 comprises receiving attribute names corresponding respectively to attributes of the product. Attributes may include things such as size, color, style, capacity, etc. A seller of the product may specify any attribute names that might be appropriate depending on the nature of the product and on the types of product attributes that may be specified by customers to define product variants.

An action 806 comprises receiving a name value set for each attribute name, wherein each name value set comprises the values that are allowed for the corresponding attribute and attribute name.

An action 808 comprises receiving one or more variant exclusions, corresponding to product variants that are not available. Each variant exclusion may comprise a variant value set, referred to herein as a disallowed variant value set, which comprises a value for each of the attributes and attribute names specified by the product family specification.

Figure 9:
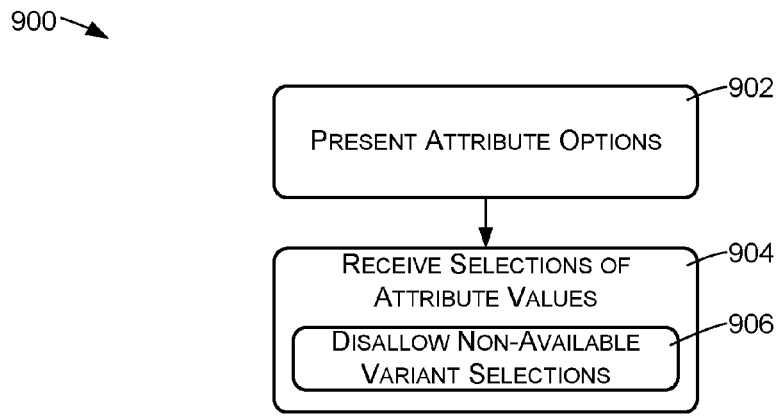
FIG. 9 is a flow diagram illustrating an example method of receiving a selection of a particular product variant.

FIG. 9 illustrates an example method 900 of selecting and/or receiving a selection of a product variant. An action 902 comprises presenting attribute options to a user, such as to a member of a business entity. The attribute options may be presented as a list of the attribute names of the product. A list of allowed attribute values may be displayed for each attribute name, and the user may be asked to select one of the attribute values for each of the attribute names. For example, a drop-down control may be associated with each attribute name so that the user can select one of the available attribute values for each attribute name.

An action 904 comprises receiving a user selection of attribute values that define a product variant. The action 904 may comprise receiving a variant value set 506, for example, which comprises an attribute value for each attribute and attribute name of the product.

The action 904 may include an action 906 of disallowing selections of product variants that have been specified as being disallowed. For example, specification of a disallowed variant value set may be disallowed or rejected.

Figure 10:
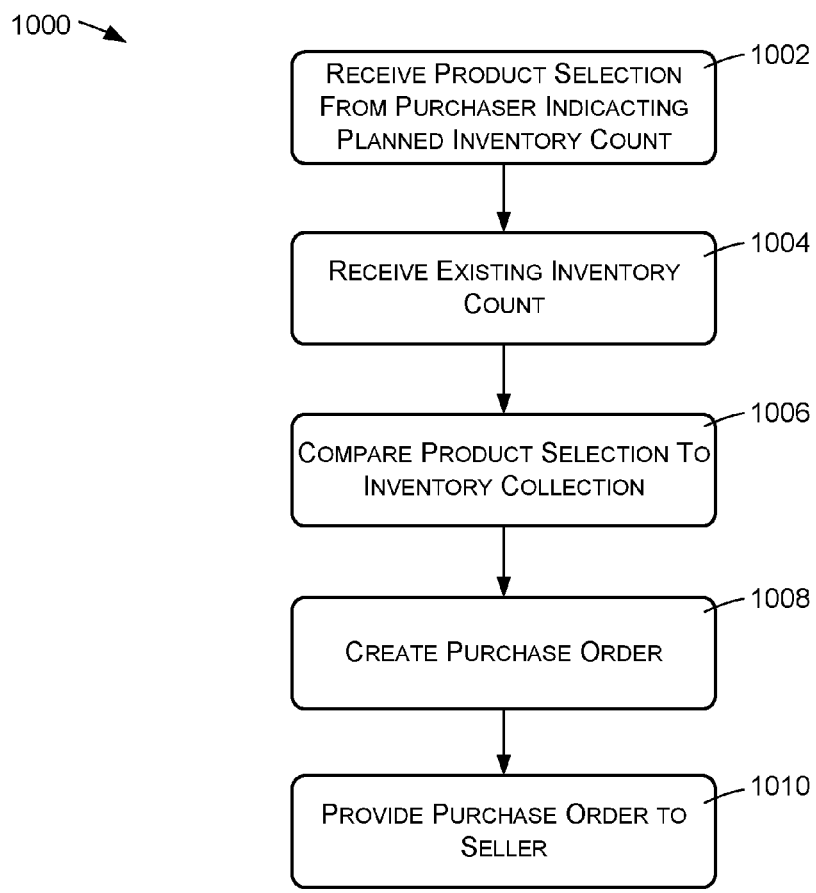
FIG. 10 is a flow diagram illustrating an example method of creating a purchase order based on a planned inventory specification.

FIG. 10 illustrates an example method 1000 of creating, receiving, and/or otherwise processing a purchase order based on a product catalog such as the product catalog 202 described above. The term "purchase order" is used to generally indicate a specification of items that are to be obtained or purchased, and may include an electronic shopping cart or other data structures and data objects that specify products and product variants.

An action 1002 comprises receiving a product selection from an entity such as a purchasing entity, wherein the product selection specifies a planned inventory count of multiple product variants. The product selection may comprise a data structure or data record such as the product selection 502 shown in FIG. 5. Such a product selection may comprise a plurality of product variant specifications 504, each of which may comprise the product family ID 302 of the product family of a planned inventory product. Each product variant specification 504 may also include a variant value set 506 that specifies a particular variant of the product family Each product variant specifications 504 may also include a count 508 of the specified product variant, indicating the planned inventory count of the product variant. Each product variant specification 504 may also comprise a time or time period 510, indicating when the planned inventory count is to be maintained. Each product variant specification 504 may also specify a location 512 at which the planned inventory count is to be maintained.

An action 1004 comprises receiving an existing inventory count for each of multiple product variants. An inventory count may again comprise a data structure such as the product selection 502, wherein each product variant specification corresponds to a product variant that is in the inventory collection of the entity. The existing inventory count may be obtained by querying the inventory service 104.

An action 1006 comprises comparing the planned inventory count for each selected product variant with the actual inventory count of the selected product variant to determine a number of each selected product variant to order. An action 1008 comprises creating a purchase order for the determined number of each selected product variant. The purchase order specifies, for each selected product variant, the corresponding variant value set 506. In some cases, the purchase order may comprise a data structure similar or identical to the product selection 502, wherein each product variant specification 504 corresponds to a product variant that is being ordered. An action 1008 comprises providing the purchase order to a seller of the selected product variants and ordering the determined number of each product variant from the seller.

Figure 11:
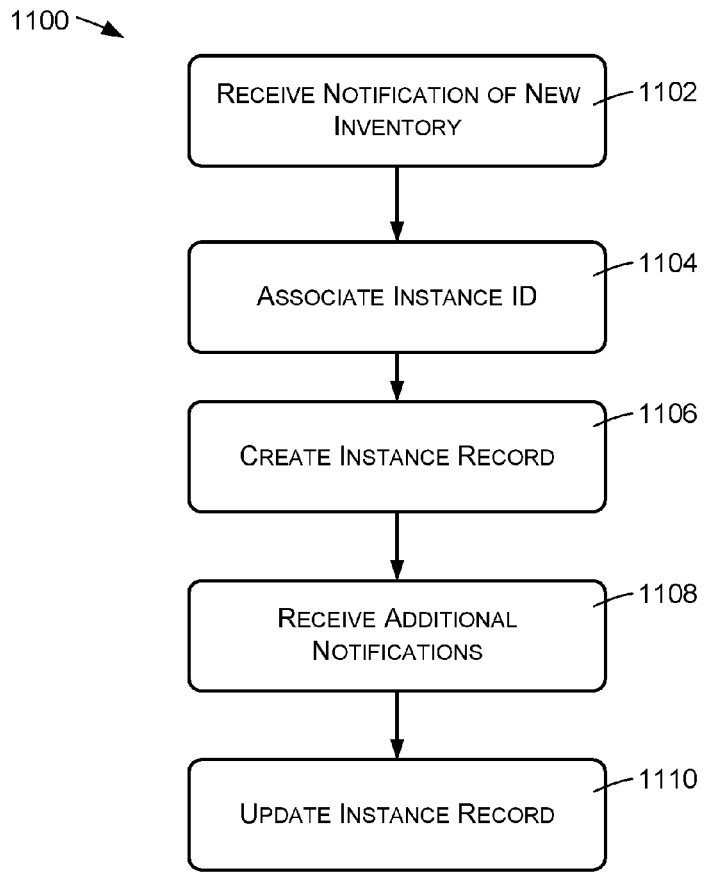
FIG. 11 is a flow diagram illustrating an example method of maintaining instance-based inventory records.

FIG. 11 illustrates an example method 1100 for maintaining inventory information regarding physical instances of products as the physical instances move through inventory collections of the entities of a product supply chain. An action 1102 comprises receiving, from a first entity, a notification or indication that the product instance has been added to the inventory collection of the first entity. In some cases, this may comprise receiving a notification or indication that the product instance has been newly manufactured. In other cases, this may comprise receiving a notification or indication that the product instance has been acquired from another entity. The product instance may start in the inventory collection of the first entity and subsequently be transferred through the inventory collections of a sequence of multiple different business entities.

An action 1104 comprises associating an instance ID with the product instance. The instance ID is created to uniquely distinguish the individual instance of the product from other instances of the product. In some cases, the instance ID may be received from the first entity. In other cases, a unique instance ID may be assigned to the newly manufactured product instance.

An action 1106 comprises creating and storing an instance data record corresponding to the product instance. The instance record may have a structure similar to the product instance data record 314 of FIG. 3, and may contain event data indicating that the product instance was added to the inventory collection of the first entity. The action 1106 may include storing the product family ID of the product instance, the instance ID of the product instance, the variant value set associated with the product instance, and other information as shown in FIG. 3 and described with reference thereto.

An action 1108 comprises receiving additional notifications as the product instance moves through the supply chain and as different events occur regarding the product instance. The additional notifications may indicate information regarding the individual instance of the product, and may be received from multiple business entities as the product instance moves through the inventory collections of the business entities. For example, events concerning an individual instance of a product may comprise any of the following:

creation of the individual instance of the product;
a sale of the individual instance of the product;
a delivery of the individual instance of the product;
a receipt of the individual instance of the product;
a location transfer of the individual instance of the product;
a return of the individual instance of the product;
a repair of the individual instance of the product;
a support incident regarding the individual instance of the product; etc.

An action 1110, which may be performed in response to receiving an additional notification of an event concerning the product instance, comprises updating the instance record based at least in part on the received information regarding the event. More specifically, the action 1110 may comprise adding event data to the instance record corresponding to the event, where the event data may comprise an event description, an event time, and an event location. For example, the instance record may be updated to show any of the events described above, including the times and locations of the events.

As a more specific example, the instance record may be updated to indicate times at which the individual instance of the product is in the inventory collection of each of multiple business entities. The event information is updated and added while retaining previously existing and recorded event information concerning the product instance, including event information generated and received from multiple different business entities.

As another example, the instance record may be updated to indicate a sale by a retailer of a product instance to a consumer. The instance record may also be updated to indicate a return of the product instance by a consumer to the retailer. The instance record may similarly be updated to indicate a return of the product instance by the retailer to a supplier or distributer of the product. This allows events to be recorded for the entire life of a product instance and may allow the detection of fraudulent product returns such as when a consumer purchase an item from one merchant and attempts to return it to a different merchant. In addition, it may provide useful information to the producer of the product regarding product quality and customer satisfaction.

The method 1100, particular the actions 1108 and 1110 of the method 1100, may be performed multiple times, upon receiving event notifications from multiple entities. For example, a notification may be received from a second entity that the product instance has been added to the inventory collection of the second entity. In response, the action 1110 may comprise adding data to the instance record indicating that the individual instance of the product was added to the second inventory collection of the second entity. As the product instance moves through the supply chain, the instance record is repeatedly updated, with previously recorded data retained, to show the history of movement of the product instance and other historical events concerning the product instance.

Figure 12:
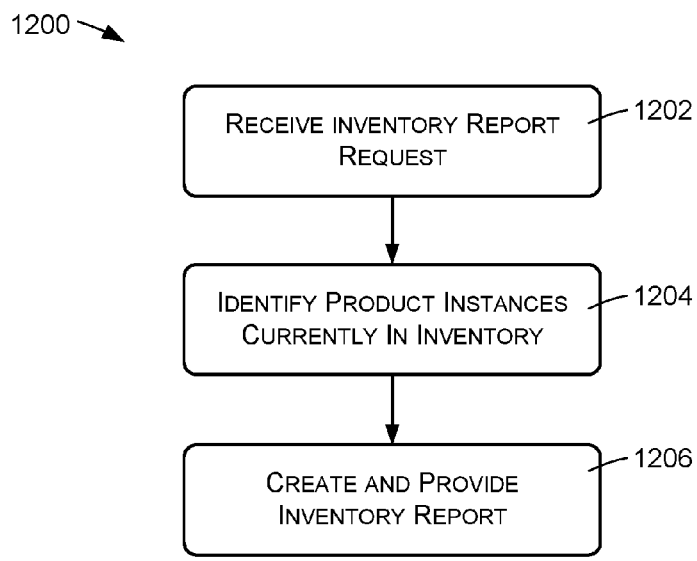
FIG. 12 is a flow diagram illustrating an example method of providing an inventory report.

FIG. 12 illustrates an example method 1200 for providing inventory reports to the entities of the product supply chain. An action 1202 comprises receiving an inventory report request from a business entity. For example, the business entity might request a report listing quantities of different product families and/or product variants that are in the inventory collection of the requesting entity.

An action 1204 comprises identifying product instances that are currently in the inventory collection of the requesting entity. This may be determined with reference to the product instance specifications 314, which as described above may indicate the current owner 320 of each product instance. For example, the inventory service 104 may search its data store 124 for product instance specifications corresponding to product instances that are currently in the inventory collection of the requesting entity. An action 1206 comprises creating and providing the inventory report to the requesting business entity, wherein the inventory report accounts for the product instances that are currently in the inventory collection of the requesting entity.

The method 1200 may be performed multiple times to create numerous inventory reports for numerous requesting business entities. As an example, a first entity may request an inventory report at a time when an individual instance of a product is in the inventory collection of the first entity. In response, the inventory service 104 may provide a first inventory report to the requesting first entity, indicating how many instances of each product are in the inventory collection of the first entity at the time of the request, while accounting for the individual instance of the product that is currently in the inventory collection of the first entity. At a later time, when the same product instance is in the inventory collection of a second entity, the second entity may request an inventory report. In response, the inventory service 104 may provide a second inventory report to the requesting second entity, indicating how many instances of each product are in the inventory collection of the second entity at the time of the request, accounting for the individual instance of the product that is now in the inventory collection of the second entity. In each case, information regarding the individual instance of the product is obtained from the same product instance specification 314, which has been updated to reflect the movement of the product instance from the inventory collection of the first entity to the inventory collection of the second entity.

FIG. 13 illustrates an example method 1300 for providing event reports to the entities of the product supply chain. An action 1302 comprises receiving a report request from a business entity. The report request may specify a particular product instance, such as by providing the instance ID of the product instance. An action 1304 comprises identifying event information that is viewable by the requesting entity. In some cases, this may comprise identifying events that occurred while the product instance was in the inventory collection or under the control of the requesting business entity. For example, the inventory service 104 may search its data store 124 for the product instance specification 314 having the product instance ID and may obtain the recorded event information from the product instance specification 314.

An action 1306 comprises creating and providing the requested event report to the requesting business entity, wherein the report lists the identified events obtained from the product instance specification 314.

FIG. 14 illustrates an example method 1400 for specifying prices and price reductions for products sold by a merchant and for determining a discounted transaction amount for a transaction conducted using a merchant POS device. An action 1402 comprises receiving and/or storing a product catalog that comprises a plurality of product specifications. As described above, each product specification comprises a product family ID. Each product specification may also include attribute specifications.

An action 1404 comprises receiving and/or storing default pricing data that specifies a default price for each product of the product catalog. The default pricing data may be specified by inventory pricing data records 328 such as shown in FIG. 3. Pricing data may be specified for multiple different time periods to indicate different default prices for the different time periods. The pricing data may also be specified for multiple different locations to indicate different default pricing for the different locations and for multiple different business entities.

An action 1406 comprises receiving and/or storing product discount data that specifies a temporary price discount for one or more products of the product catalog. The product discount data may be specified by product discount data records 338 such as shown in FIG. 3. Product discount data may be specified for multiple different time periods to indicate different price discounts for the different time periods. The product discount data may also be specified for multiple different locations to indicate different discounts for the different locations and for multiple different business entities.

An action 1408 comprises receiving and/or storing product bundle discount data that specifies a price discount for purchases of specified bundles of products. The product bundle discount data may be specified by bundle discount data records 348 such as shown in FIG. 3. The product bundle discount data may be specified for multiple different time periods to indicate different promotional schemes and discounts for the different time periods. Product bundle discount data may also be specified for multiple different locations to indicate different types and amounts of discounts for the different locations and for multiple different business entities.

An action 1410 comprises receiving a request for a purchase transaction in which multiple products are specified for purchase. In response to receiving the request, an action 1412 is performed of determining and providing a discounted transaction price for the transaction. The action 1412 may comprise first determining the default prices of the items of the purchase transaction, such as by locating the inventory pricing records 328 corresponding respectively to the product instances of the purchase transaction. The action 1412 may then determine any temporary single-instance price discounts by locating the product discount data records 338 corresponding respectively to the product instances of the purchase transaction. The action 1412 may then determine any applicable bundle discounts that may apply to the products of the transaction by locating any bundle discount data records 348 that specify product family IDs corresponding to any of the product family IDs of the products of the purchase transaction.

Depending on the particular implementation, discounts may be applied in various ways. As one example, a discount may be applied proportionally across multiple items of a transaction, in accordance with the original prices of the transaction items.

The action 1412 may further comprise verifying that the time periods specified by the product discount data records 338 and the bundle discount records 348 encompass the current time of the purchase transaction.

The discounted transaction price is then determined by subtracting any discounts specified by the product discount data records 338 and the bundle discount records 348 from a sum of the default prices of the purchase transaction items.

An action 1414 comprises providing the discounted transaction amount to the POS device of the requesting business entity for completion of the purchase transaction.

FIG. 15 illustrates an example method 1500 for specifying prices and price reductions for products sold by a merchant or other business entity. An action 1502 comprises publishing multiple price reduction templates, also referred to herein as bundled discount templates, for use by various business entities when specifying bundled price discounts or reductions. Each discount template may be stored as a data record and may include a template ID that can be referenced by the business entity when specifying a bundled price reduction. Each discount template may also include or specify a discount formula that specifies logic for applying a multi-product or multi-instance discount. The formula may specify conditions that are to be met in order for the discount to become effective. The conditions may be specified in terms of variables, wherein the business entity supplies values for the variables when specifying the discount template. For example, the business entity may identify the products to which the discount is applicable, the number of products or the dollar amount of product that must be purchases in order to receive the discount, a percentage or absolute discount amount, and so forth.

An action 1504 comprises receiving a designation of a product, such as a product family as described herein, for which pricing details are to be provided by a seller. For example, the product may be specified by its product family ID.

An action 1506 comprises receiving a default selling price of the product from the seller. In some cases, the seller may also produce an effective time period for the default selling price, wherein the default selling price is to be effective only during the effective time period. The seller may provide multiple default selling prices and corresponding effective time periods, so that each default selling price is effective during a different time period. The seller may also provide a location qualifier indicating that the provided default selling price is effective at one or more locations or within one or more geographic areas. The seller may provide multiple default selling prices and corresponding location qualifiers, so that each default selling price is effective for a different location. Generally, the seller may specify multiple default prices for a single product, corresponding respectively to different time periods and/or locations. Furthermore, each of multiple sellers may also specify one or more default prices for the product.

An action 1508 comprises storing the received default price, such as by creating and storing an inventory pricing data record 328 as shown in FIG. 3 and associating the inventory pricing data record with a product specification 204 of the product to which the received default price applies.

An action 1510 comprises receiving a single-product price reduction and an effective time period during which the single-product price reduction will be effective. The seller may also provide a location qualifier indicating that the provided single-product price reduction is effective at one or more locations or within one or more geographic areas. The seller may provide multiple single-product price reductions and corresponding location qualifiers, so that each single-product price reduction is effective for a different location. Generally, the seller may specify multiple single-product price reductions for a single product, corresponding respectively to different time periods and/or locations. Furthermore, each of multiple sellers may also specify one or more single-product price reductions for the product. Price reductions may be specified as absolute amounts or percentage discounts.

An action 1512 comprises storing the single-product price reduction, such as by creating and storing a product discount data record 338 as shown in FIG. 3 and associating the product discount data record 338 with the product specification 204 of the product to which the received single-product price reduction applies.

An action 1514 comprises receiving a multi-product price reduction, also referred to herein as a bundle reduction or discount, and an effective time period during which the multi-product price reduction will be effective. As described above, the multi-product price reduction is for the purchase of multiple qualifying products, wherein the price reduction is conditioned upon purchasing a certain combination and/or dollar amount of specified products, such as by purchasing of at least a qualifying number of the qualifying products. The action 1514 also comprises receiving a designation or specification of the qualifying products, such as by receiving product family IDs of the qualifying products.

In some cases, the action 1514 may comprise receiving a discount formula from the seller or receiving a selection by the seller of a bundle discount template or price reduction template that specifies a discount formula. A discount formula may specify the conditions or logic for applying the multi-product price reduction.

The seller may also provide a location qualifier indicating that the provided multi-product price reduction is effective at one or more locations or within one or more geographic areas. The seller may provide multiple multi-product price reductions and corresponding location qualifiers, so that each multi-product price reduction is effective for a different location. Generally, the seller may specify multiple multi-product price reductions for the same or overlapping groups of products, corresponding respectively to different time periods and/or locations. Furthermore, each of multiple sellers may also specify one or more multi-product price reductions for the products. Price reductions may be specified as absolute amounts or percentage discounts.

An action 1516 comprises storing the multi-product price reduction, such as by creating and storing a bundle discount data record 348 as shown in FIG. 3 and associating the bundle discount data record 348 with the product specification 204 of the product to which the received multi-product price reduction applies.

FIG. 16 illustrates an example method 1600 for determining a transaction amount for a purchase transaction conducted using, as an example, a merchant POS device. An action 1602 comprises receiving a transaction request from the merchant POS device, wherein the transaction request specifies multiple products for purchase.

An action 1604 comprises determining a default price for each of the products specified by the transaction request. The action 1604 may comprise performing a query to locate inventory pricing records 328 corresponding to the seller, to the products specified by the purchase transaction, to the time of the purchase transaction, and to the location of the purchase transaction.

An action 1606 comprises identifying any effective single-product discounts for the products specified by the transaction request. The action 1606 may comprise performing a query to locate product discount records 338 corresponding to the seller, to the products specified by the purchase transaction, to the time of the purchase transaction (referred to here as the "transaction" time), and to the location at which the purchase transaction is being conducted.

An action 1608 comprises identifying any effective bundle or multi-product discounts for the products specified by the transaction request. The action 1608 may comprise performing a query to locate bundle discount data records 348 corresponding to the seller, to the products specified by the purchase transaction, to the time of the purchase transaction, and to the location of the purchase transaction. The action 1608 may account for any conditions specified by the bundle discount, such as may be specified by a discount formula 352 associated with the bundle discount or with a bundle template that has been specified in association with the bundle discount.

An action 1610 comprises calculating a discounted transaction amount for the purchase transaction, wherein the discounted transaction amount is based on the default prices of the transaction products, any effective product discounts corresponding to the transaction products, and any effective bundle discounts for the products of the transaction.

An action 1612 comprises providing the discounted transaction amount to the merchant POS device. An action 1614 comprises completing the transaction using the discounted transaction amount. For example, the action 1614 may comprise a transfer of funds from an account of a purchaser to an account of the seller.

Although FIG. 16 assumes specific types of pricing details, such as a default price, a single-product discount, and a multi-product discount, the method can be described more generally as involving multiple price specifications, each of which may indicate a default price, a single-product price reduction, and/or a multi-product price reduction. Each of the price specifications may indicate a corresponding effective time period. In some cases, the time periods may overlap. When a transaction is being conducted within the effective time periods of multiple price specifications corresponding to one of the products of the transaction, all of the multiple price reductions are applied to the transaction.

As a specific example, suppose that a transaction request is received at a first time that is within the effective time period of a single price specification for a product of the transaction request. In this case, the transaction amount is calculated based on the single price specification. As another example, suppose that a transaction request is received at a second time that is within the effective time periods of two price specifications for the product. In this case, the transaction amount is calculated based on both of the price specifications.

Figure 17:
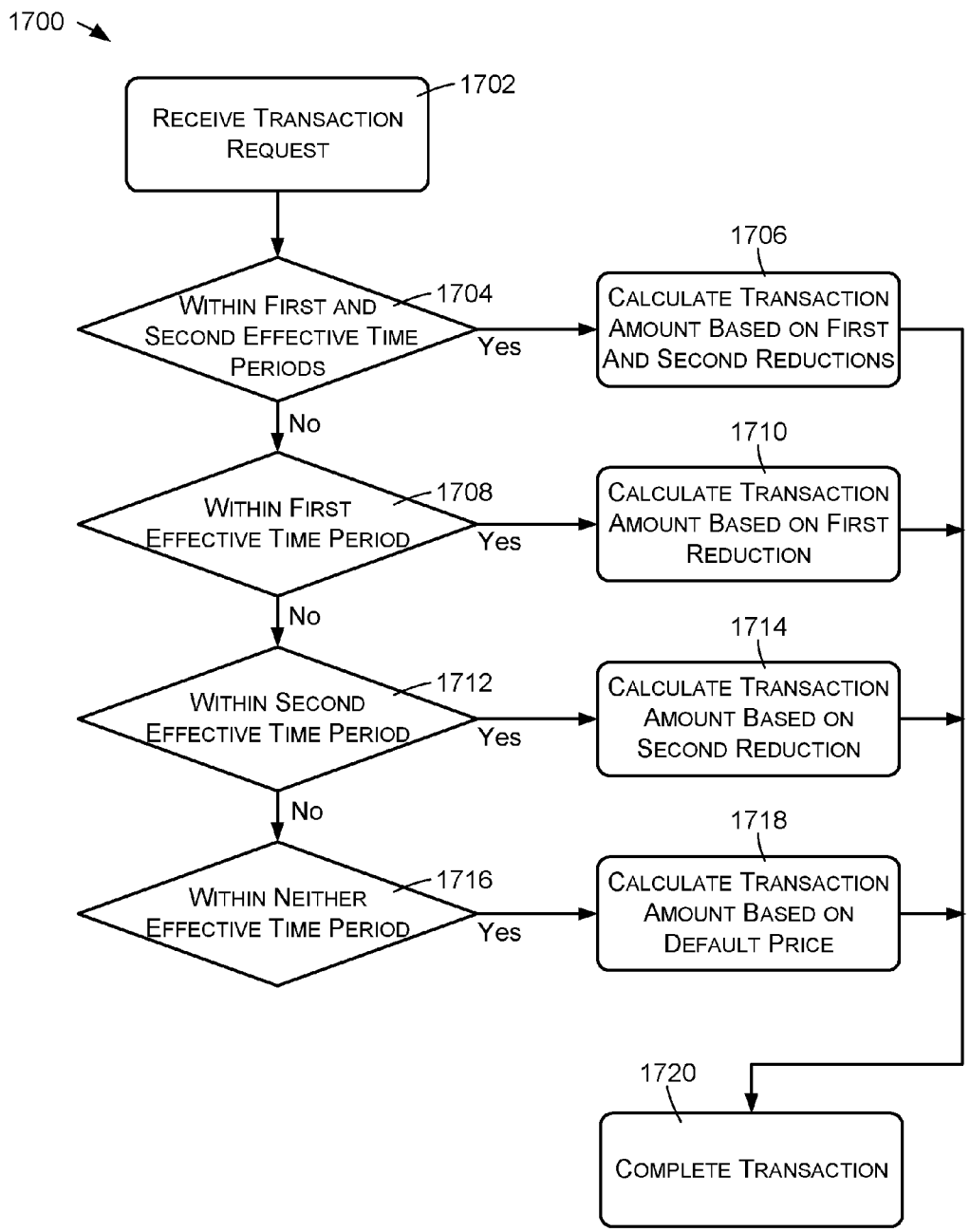
FIG. 17 is a flow diagram illustrating an example method for calculating a transaction amount and completing a transaction based on time dependent price reductions.

FIG. 17 shows an example method 1700 illustrating the time dependencies of pricing reductions. In this example an action 1702 comprises receiving a transaction request that specifies a particular product to which three pricing records apply: an inventory pricing record 328 specifying a default price of the product, a product discount record 338 specifying a single-product price reduction for the product, and a bundle discount record 348 specifying a multi-product price reduction for the purchase of multiple qualifying products that include the product. Each of the pricing records specifies a different effective time period, although the effective time periods of the pricing records may overlap. For purposes of discussion, it is assumed that the transaction time is within the effective time period specified for the default price. The transaction time may or may not be within the effective time periods specified for the single-product price reduction or the multi-product price reduction. In the following discussion, the effective time period specified for the single-product price reduction is referred to as the first effective time period. The effective time period specified for the multi-product price reduction is referred to as the second effective time period.

An action 1704 comprises determining whether the transaction time is within both of the first and second effective time periods. If the transaction time is within both of the first and second effective time periods, an action 1706 is performed of calculating a transaction amount for the purchase transaction based on the default selling price of the product, the single-product price reduction, and the multi-product price reduction. An action 1720 is then performed, comprising completing the transaction using the calculated transaction amount.

If the transaction time is not within both of the first and second effective time periods, an action 1708 is performed of determining whether the transaction time is within the first effective time period. If the transaction time is within the first effective time period, an action 1710 is performed of calculating the transaction amount for the purchase transaction based on the default selling price of the product and the single-product price reduction. The action 1720 is then performed, comprising completing the transaction using the calculated transaction amount.

If the transaction time is not within the first effective time period, an action 1712 is performed of determining whether the transaction time is within the second effective time period. If the transaction time is within the second effective time period, an action 1714 is performed of calculating the transaction amount for the purchase transaction based on the default selling price of the product and the multi-product price reduction. The action 1720 is then performed, comprising completing the transaction using the calculated transaction amount.

If the transaction time is not within the second effective time period, an action 1716 is performed of determining that the transaction time is outside of both the first or second effective time periods, and an action 1718 is performed of calculating the transaction amount for the purchase transaction based on the default selling price of the product. The action 1720 is then performed, comprising completing the transaction using the calculated transaction amount.

Figure 18:
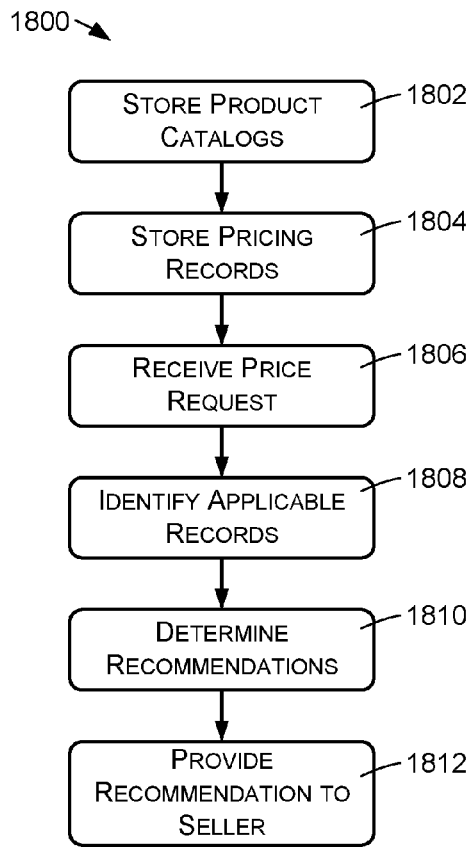
FIG. 18 is a flow diagram illustrating an example method for providing price recommendations based on historical pricing data.

FIG. 18 illustrates a method 1800 of generating pricing recommendations based on historical data stored by the support service 102. An action 1802 comprises storing multiple product catalogs as described above, wherein each product catalog specifies multiple products.

An action 1804 comprises storing multiple historical pricing records. As an example, such pricing records may comprise the inventory pricing data records 328 described above with reference to FIG. 3. Each pricing record corresponds to one of multiple merchants and to a product specified by one of the product catalogs. Each pricing record indicates a historical selling price set by the corresponding merchant for the corresponding product during a corresponding time period.

An action 1806 comprises receiving a pricing recommendation request from the merchant, for a designated product specified by the product catalog, for a designated current or future time period. In some cases, the action 1806 may also comprise receiving a designated location for which a pricing recommendation is to be provided.

An action 1808 comprises identifying a plurality of the historical pricing records corresponding to the designated product, wherein the identified pricing records include records corresponding to a plurality of different merchants. As an example, the action 1808 may comprise identifying historical pricing records of a time period of a previous year corresponding to the designated time period. The action 1808 may also comprise identifying historical pricing records that correspond to the designated location.

An action 1810 comprises analyzing the identified historical pricing records to determine a recommended selling price for the designated product, based at least in part on the historical selling prices indicated by the identified historical pricing records. For example, the action 1810 may comprise determining an average selling price for the product by multiple merchants. As another example, the action 1810 may determine an optimum selling price based on the prices specified by other merchants and the corresponding achieved sales rates.

An action 1812 comprises providing the recommended selling price to the merchant.

Figure 19:
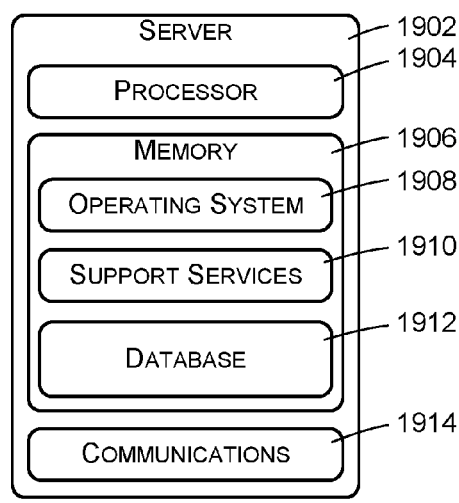
FIG. 19 is a block diagram illustrating select components of a computer server device that may be used in part to implement the services described herein.

FIG. 19 shows an example of a server 1902, which may be used in part to implement the functionality of the support services 102. Generally, the support services 102 may be implemented by a plurality of servers 1902 or server instances such as shown in FIG. 19.

In the illustrated example, the server 1902 includes at least one processor 1904 and associated memory 1906. Each processor 1904 may itself comprise one or more processors or processing cores. For example, the processor 1904 can be implemented as one or more microprocessors, microcomputers, microcontrollers, digital signal processors, central processing units, state machines, logic circuitries, and/or any devices that manipulate signals based on operational instructions. In some cases, the processor 1904 may be one or more hardware processors and/or logic circuits of any suitable type specifically programmed or configured to execute the algorithms and processes described herein. The processor 1904 can be configured to fetch and execute computer-readable and processor-executable instructions stored in the memory 1906.

Depending on the configuration of the server 1902, the memory 1906 may be an example of tangible non-transitory computer storage media and may include volatile and non-volatile memory and/or removable and non-removable media implemented in any type of technology for storage of information such as computer-readable processor-executable instructions, data structures, program modules or other data. The memory 1906 may include, but is not limited to, RAM, ROM, EEPROM, flash memory, solid-state storage, magnetic disk storage, optical storage, and/or other computer-readable media technology. Further, in some cases, the server 1902 may access external storage, such as RAID storage systems, storage arrays, network attached storage, storage area networks, cloud storage, or any other medium that can be used to store information and that can be accessed by the processor 1904 directly or through another computing device or network. Accordingly, the memory 1906 may be computer storage media able to store instructions, modules or components that may be executed by the processor 1904. Further, when mentioned, non-transitory computer-readable media exclude media such as energy, carrier signals, electromagnetic waves, and signals per se.

The memory 1906 may be used to store and maintain any number of functional components that are executable by the processor 1904. In some implementations, these functional components comprise instructions or programs that are executable by the processor 1904 and that, when executed, implement operational logic for performing the actions and services attributed above to the support services 102.

In the context of the examples described above, functional components of the server 1902 stored in the memory 1906 may include an operating system 1908 for controlling and managing various functions of the server 1902. The memory 1906 may also store a support service component 1910 that is responsible for implementing the functionality that is attributed above to the support services 102. The support service component 1910, in addition to the functionality described above, may be responsible for receiving content requests from networked client devices and providing content in response to such requests. The memory 1906 may also have a database component 1912 or other component for storing and accessing data records. The memory 1906 may also store additional data, data structures, and the like, not shown, that are used in the course of providing the described services.

The server 1902 may have a network communications interface 1914, such as an Ethernet communications interface, which provides communication by the server 1902 with other servers and with client devices such as the client POS devices.

The server 1902 may of course include many other logical, programmatic, and physical components that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of generating, by a first point-of-sale (POS) device, a first business entity product catalog, the method comprising:
    receiving, by the first POS device of a first business entity, a second business entity product catalog published from a second POS device of a second business entity;
    receiving, by the first POS device of the first business entity, a third business entity product catalog published from a third POS device of a third business entity;
    selecting, at the first POS device of the first business entity, at least one product specification from the second business entity product catalog;
    selecting, at the first POS device of the first business entity, at least one product specification from the third business entity product catalog;
    generating, at the first POS device of the first business entity, the first business entity product catalog including:
        (i) the at least one product specification selected from the second business entity product catalog, and
        (ii) the at least one product specification selected from the third business entity product catalog; and
    transmitting, from the first POS device, the first business entity product catalog to a fourth POS device of a fourth business entity.

2. The method of claim 1, wherein the at least one product specification selected from the second business entity product catalog, and the at least one product specification selected from the third business entity product catalog comprises:
    a product family identifier (ID) of a product that has multiple product variants;
    attribute names corresponding respectively to attributes of the product; and
    name value sets corresponding respectively to the attributes of the product, each name value set comprising multiple allowed attribute values for the corresponding attribute, each product variant being defined by a corresponding variant value set, wherein each variant value set comprises, for each attribute, an allowed attribute value.

3. The method of claim 1, further comprising:
    receiving, from the fourth POS device of the fourth business entity, a purchase specification including at least one product specification selected by the fourth business entity on the fourth POS device from the first business entity product catalog including the at least one product specification selected from the second business entity product catalog, and the at least one product specification selected from the third business entity product catalog.

4. The method of claim 1, further comprising:
receiving, at the first POS device of the first business entity, information of data records corresponding to products in at least one of:
an inventory collection of products of the first business entity, or
an inventory collection of products of the fourth business entity.

5. The method of claim 1, wherein the first business entity product catalog further includes:
(iii) a product specification not included in either one of the second business entity product catalog or the third business entity product catalog.

6. The method of claim 1, wherein each of the business entity product catalogs further includes at least one product specification corresponding respectively to a product available for sale.

7. The method of claim 1, wherein each of the business entity product catalogs further includes data indicating:
one of a creator or an owner of the product catalog;
a date the product catalog was one of created or updated; and
one of permissions or rules indicating particular business entities allowed to view the product catalog.

8. A method of publishing, by a support services server, a first business entity product catalog of a first business entity, the method comprising:
receiving, at the support services server from a first point-of-sale (POS) device of the first business entity, the first business entity product catalog, wherein the first business entity product catalog comprises:
at least one product specification from a second business entity product catalog, and
at least one product specification from a third business entity product catalog;
storing the first business entity product catalog on a storage device at the support services server; and
publishing the first business entity product catalog to a fourth POS device of a fourth business entity.

9. The method of claim 8, wherein each of the at least one product specification from the second business entity product catalog, and each of the at least one product specification from the third business entity product catalog comprises:
a product family identifier (ID) of a product that has multiple product variants;
attribute names corresponding respectively to attributes of the product; and
name value sets corresponding respectively to the attributes of the product, each name value set comprising multiple allowed attribute values for the corresponding attribute, each product variant being defined by a corresponding variant value set, wherein each variant value set comprises, for each attribute, an allowed attribute value.

10. The method of claim 8, further comprising:
receiving, from the fourth POS device of the fourth business entity, a purchase specification including at least one product specification selected by the fourth business entity on the fourth POS device from the first business entity product catalog including the at least one product specification selected from the second business entity product catalog and the at least one product specification selected from the third business entity product catalog.

11. The method of claim 8, further comprising:
transmitting to at least one of the first POS device of the first business entity, or the fourth POS device of the fourth business entity, information of data records corresponding to products in at least one of
an inventory collection of products of the first business entity, or
an inventory collection of products of the fourth business entity.

12. The method of claim 8, further comprising transmitting to the fourth POS device of the fourth business entity, a sale price of a product specification at a time of sale when a purchase specification is generated on the fourth POS device of the fourth business entity.

13. The method of claim 8, further comprising:
transmitting to the fourth POS device of the fourth business entity at least one of a current or a scheduled product promotion associated with the first business entity product catalog.

14. The method of claim 8, further comprising:
receiving a communication from the fourth POS device of the fourth business entity regarding pricing of products associated with the first business entity product catalog.

* * * * *